United States Patent
Troy et al.

(10) Patent No.: US 10,791,275 B2
(45) Date of Patent: Sep. 29, 2020

(54) METHODS FOR MEASURING AND INSPECTING STRUCTURES USING CABLE-SUSPENDED PLATFORMS

(71) Applicant: The Boeing Company, Chicago, IL (US)

(72) Inventors: James J. Troy, Issaquah, WA (US); Gary E. Georgeson, Tacoma, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 173 days.

(21) Appl. No.: 15/833,094

(22) Filed: Dec. 6, 2017

(65) Prior Publication Data

US 2019/0098221 A1 Mar. 28, 2019

Related U.S. Application Data

(63) Continuation-in-part of application No. 15/714,662, filed on Sep. 25, 2017.

(51) Int. Cl.
*H04N 5/232* (2006.01)
*G01C 3/02* (2006.01)
(Continued)

(52) U.S. Cl.
CPC ......... *H04N 5/23296* (2013.01); *F03D 17/00* (2016.05); *G01B 5/0004* (2013.01);
(Continued)

(58) Field of Classification Search
CPC ............... G01N 21/88; G01N 21/8803; G01N 21/8816; G01N 21/8806; H04N 5/23296;
(Continued)

(56) References Cited

U.S. PATENT DOCUMENTS 4,413,905 A 11/1983 Holzapfel
4,710,819 A 12/1987 Brown
(Continued)

FOREIGN PATENT DOCUMENTS

DE 102013000410 A1 7/2014
KR 20170084966 A 7/2017
(Continued)

OTHER PUBLICATIONS

Partial European Search Report dated Dec. 18, 2018 in European Patent Application No. 18175541.4 (European counterpart of the instant patent application).
(Continued)

*Primary Examiner* — Maria E Vazquez Colon
(74) *Attorney, Agent, or Firm* — Ostrager Chong Flaherty & Broitman PC

(57) ABSTRACT

Systems and methods for measuring the distance to a target object and acquiring three-dimensional coordinates, scale information, and point-to-point distance information for that target object in an environment using a remotely operated cable-suspended platform. The system uses on-board sensors and processing techniques to provide discrete or continuous measurements of the distances between points on a target object or the scale of the target object. The addition of on-board three-dimensional measurement capabilities to cable-suspended platforms enables these systems to acquire three-dimensional position data defined in the coordinate system of the environment, determine distances between objects or between points on the same object. The system can also be used to determine the scale factors of items in images captured by a camera carried by the cable-suspended platform, in the course of performing metrology-related tasks.

26 Claims, 23 Drawing Sheets

(51) Int. Cl.
| | |
|---|---|
| *G01B 11/00* | (2006.01) |
| *G06T 7/73* | (2017.01) |
| *G06T 7/521* | (2017.01) |
| *H04N 7/18* | (2006.01) |
| *G01B 5/00* | (2006.01) |
| *G01N 21/88* | (2006.01) |
| *F03D 17/00* | (2016.01) |
| *G01C 11/02* | (2006.01) |
| *G01N 21/95* | (2006.01) |

(52) U.S. Cl.
CPC .............. *G01B 11/002* (2013.01); *G01C 3/02* (2013.01); *G01C 11/02* (2013.01); *G01N 21/8806* (2013.01); *G06T 7/521* (2017.01); *G06T 7/74* (2017.01); *H04N 5/23299* (2018.08); *H04N 7/18* (2013.01); *H04N 7/183* (2013.01); *G01N 21/9515* (2013.01); *G06T 2207/10028* (2013.01); *G06T 2207/30244* (2013.01)

(58) Field of Classification Search
CPC ............ B64C 39/024; B64C 2201/123; B64C 2201/146; G01C 11/02; G01M 5/0008; G01M 5/0033; G01M 5/0075; G01S 17/10; G01S 17/87; G01S 17/88; G01S 17/933; G05D 1/0038; G05D 1/102; G06K 9/00637
See application file for complete search history.

(56) References Cited

U.S. PATENT DOCUMENTS

| | | | |
|---|---|---|---|
| 5,113,768 A | 5/1992 | Brown | |
| 7,859,655 B2 | 12/2010 | Troy et al. | |
| 8,744,133 B1 | 6/2014 | Troy et al. | |
| 9,221,506 B1 | 12/2015 | Georgeson et al. | |
| 9,285,296 B2 | 3/2016 | Georgeson et al. | |
| 9,804,577 B1* | 10/2017 | Troy | G05B 15/02 |
| 10,471,590 B1* | 11/2019 | Vachon | B25J 9/104 |
| 2009/0086199 A1* | 4/2009 | Troy | G01S 7/497 356/251 |
| 2010/0097460 A1 | 4/2010 | Abernathy | |
| 2010/0150296 A1* | 6/2010 | Togasawa | G21C 19/207 376/260 |
| 2011/0043515 A1* | 2/2011 | Stathis | G01C 15/002 345/419 |
| 2012/0262708 A1 | 10/2012 | Connolly | |
| 2013/0092852 A1 | 4/2013 | Baumatz | |
| 2014/0376768 A1* | 12/2014 | Troy | G06K 9/3241 382/103 |
| 2015/0116481 A1* | 4/2015 | Troy | B64F 5/60 348/128 |
| 2015/0324643 A1* | 11/2015 | Lambert | G01N 21/88 348/38 |
| 2017/0192418 A1* | 7/2017 | Bethke | G08G 5/0013 |
| 2018/0002010 A1* | 1/2018 | Bauer | B64C 39/024 |
| 2018/0149138 A1* | 5/2018 | Thiercelin | B64D 47/08 |
| 2018/0273173 A1* | 9/2018 | Moura | G01N 25/72 |
| 2019/0035144 A1* | 1/2019 | Evers-Senne | G01B 11/24 |
| 2019/0049962 A1* | 2/2019 | Ouellette | G01S 17/86 |

FOREIGN PATENT DOCUMENTS

| | | |
|---|---|---|
| WO | 2017050893 A1 | 3/2017 |
| WO | 2017065102 A1 | 4/2017 |

OTHER PUBLICATIONS

Extended European Search Report dated Jul. 4, 2019 in European Patent Application No. 18175541.4 (European counterpart of the instant patent application).

Examination Report dated May 25, 2020 in GCC Patent Application No. GC 2018-36059.

* cited by examiner

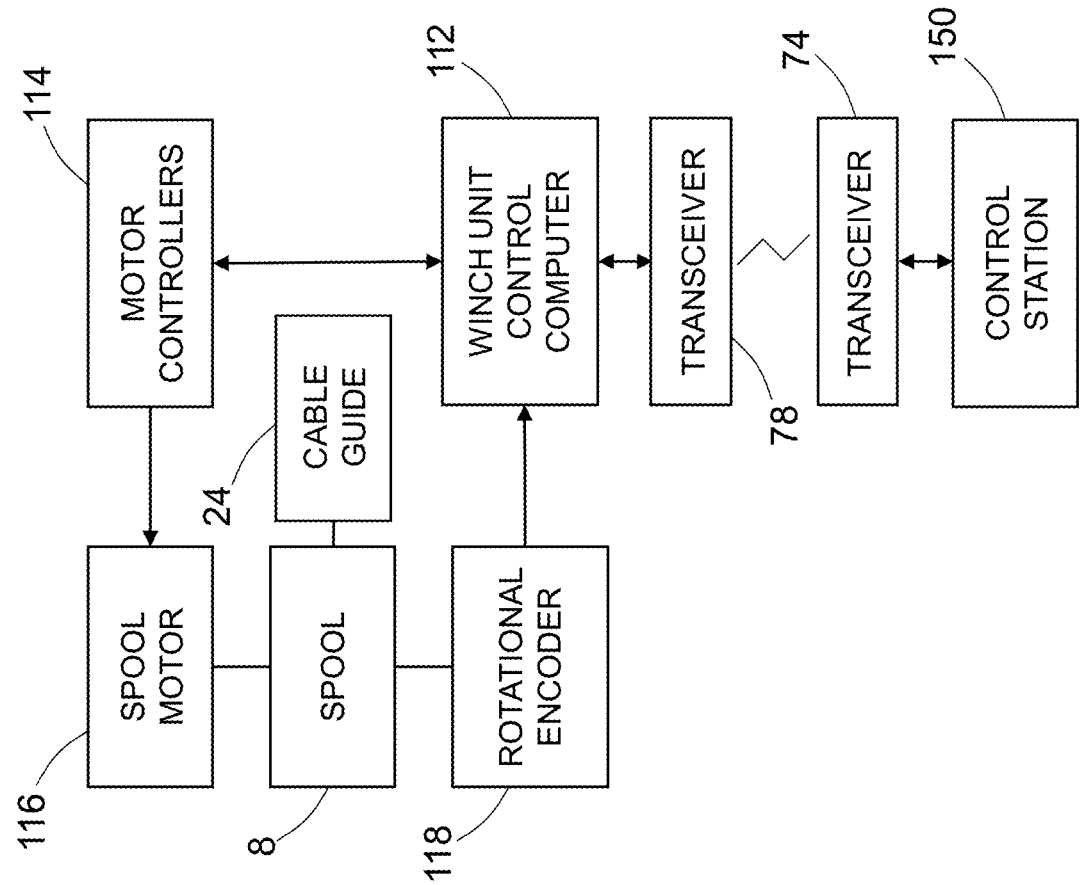
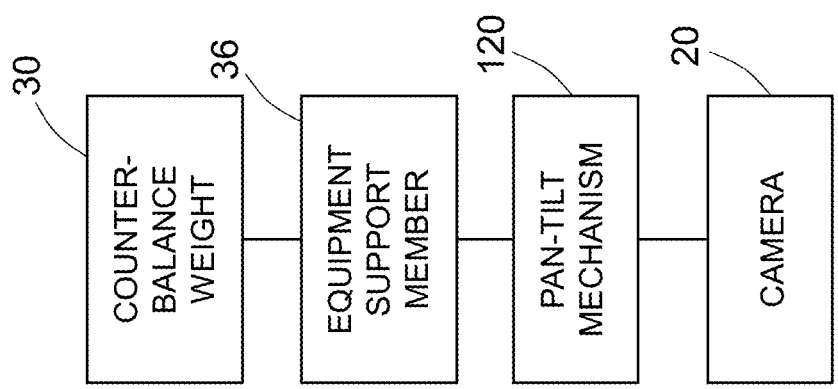

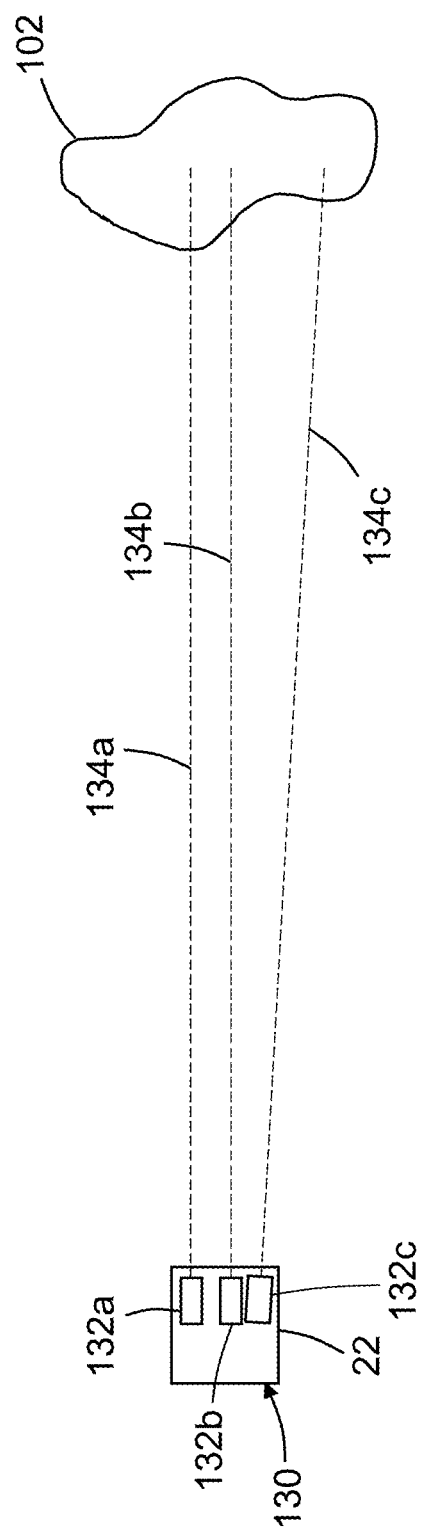

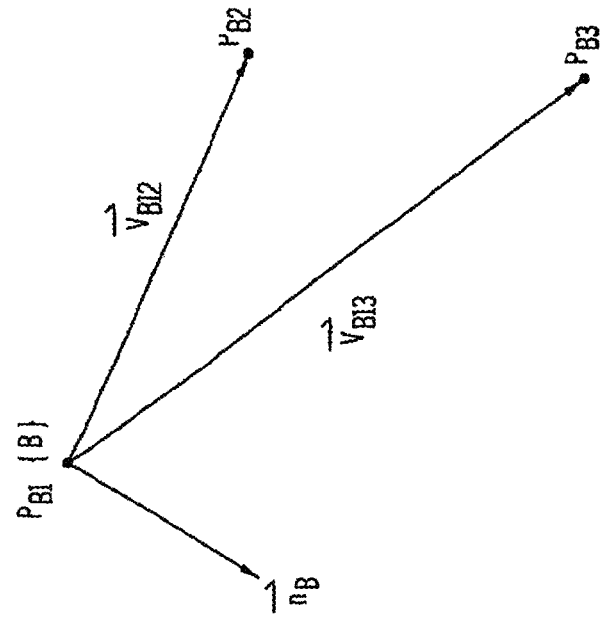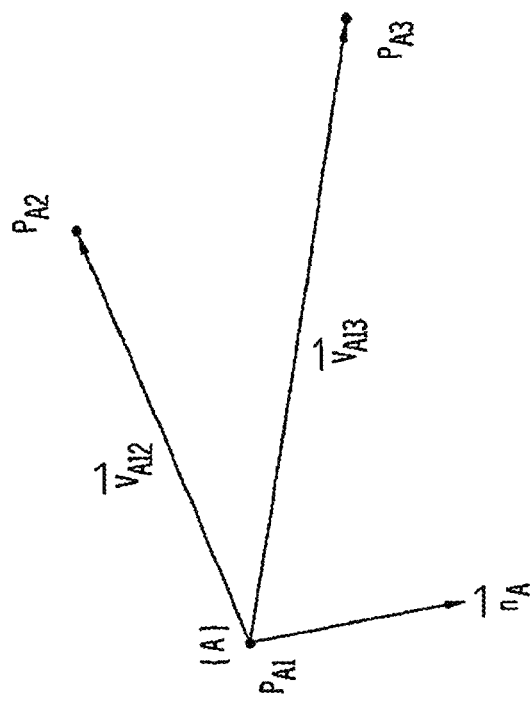
FIG. 21

METHODS FOR MEASURING AND INSPECTING STRUCTURES USING CABLE-SUSPENDED PLATFORMS

RELATED PATENT APPLICATION

This application is a continuation-in-part of and claims priority from U.S. patent application Ser. No. 15/714,662 filed on Sep. 25, 2017.

BACKGROUND

The disclosure relates to position measurement for repair and maintenance management of large structures such as aircraft. More particularly, the disclosure relates to a local positioning system and methods for non-destructive measurement and inspection of vehicles such as aircraft that do not require physical contact with the vehicle.

When repair work is required on vehicles, such as on the skin of an aircraft, it may be necessary to take into account the size, shape and location of structural anomalies for optimum repair of the vehicle. Photographs of the structural anomalies may be made but may not be precisely located or sized on a target object or may not be useful for repair planning. During the analysis of a location of interest on the target object, it may be desirable to obtain measurement information without contacting the target object. Due to accessibility and/or contact constraints, it may be difficult to reach the location of interest to obtain position measurements. Therefore it is advantageous for a local positioning system to be able to take measurements without contacting the target object and from moderate to large distances from the target object.

SUMMARY

Finding and accurately measuring the locations of structural anomalies on a structure or vehicle, such as a large commercial airplane, can be a laborious task. An efficient and automated process for addressing this problem would be valuable to many organizations involved in building and maintaining large vehicles and structures.

The subject matter disclosed in some detail below is directed to systems and methods for measuring the distance to a target object and acquiring three-dimensional coordinates, scale information, and point-to-point distance information for that target object in an environment using a remotely operated cable-suspended platform. The measurement system uses on-board sensors to acquire data and then uses computer processing techniques to provide discrete or continuous measurements of three-dimensional coordinates of points or the distances between points on a target object or the scale of the target object.

Although various embodiments of systems and methods for acquiring three-dimensional coordinate information for points or scale and point-to-point distance information for target objects undergoing non-destructive inspection using a cable-suspended platform are described in some detail later herein, one or more of those embodiments may be characterized by one or more of the following aspects.

One aspect of the subject matter disclosed in detail below is a method for calculating a position of a point of interest on a target object in a frame of reference using a cable-suspended platform comprising an equipment support member, a pan-tilt mechanism mounted to the equipment support member, a camera mounted to the pan-tilt mechanism, and a laser range meter affixed to the camera, the method comprising: (a) suspending the cable-suspended platform from a plurality of cables connected to the equipment support member and supported at respective anchor points of a plurality of anchor points; (b) calibrating the pan-tilt mechanism relative to the frame of reference; (c) controlling lengths of paid-out portions of the plurality of cables in a manner that causes the equipment support member to move so that the camera is within range of a target object; (d) measuring the respective distances of a center point of the equipment support member from the respective anchor points based in part on the lengths of the paid-out portions of the plurality of cables; (e) controlling the pan-tilt mechanism to cause the laser range meter to aim at a point of interest on the target object; (f) measuring the pan and tilt angles of the pan-tilt mechanism while the laser range meter is aimed at the point of interest; (g) measuring the distance separating the laser range meter and the point of interest; and (h) converting the distance and angle measurements into a Cartesian coordinate vector representing the position of the point of interest in the frame of reference.

In accordance with one embodiment of the method described in the preceding paragraph, the frame of reference is a frame of reference of the target object, and step (b) comprises: aiming the laser range meter at three or more calibration points on the target object at different times while the equipment support member is stationary; and computing a calibration matrix representing a transformation from a frame of reference of the pan-tilt mechanism to the frame of reference of the target object. In one proposed implementation, step (b) further comprises: measuring the pan and tilt angles of the pan-tilt mechanism while the laser range meter is aimed at each calibration point; and measuring the distance separating the laser range meter and each calibration point while the laser range meter is aimed at each calibration point.

In accordance with an alternative embodiment, the frame of reference is a frame of reference of a plurality of at least three anchor points supporting respective cables of the plurality of cables, and step (b) comprises: aiming the laser range meter at three or more anchor points of the plurality of anchor points at different times while the equipment support member is stationary; and computing a calibration matrix representing a transformation from a frame of reference of the pan-tilt mechanism to the frame of reference of the plurality of anchor points. In one proposed implementation, step (b) further comprises: measuring the pan and tilt angles of the pan-tilt mechanism while the laser range meter is aimed at each anchor point; and measuring the distance separating the laser range meter and each anchor point while the laser range meter is aimed at each anchor point.

Another aspect of the subject matter disclosed in detail below is a method for inspecting and measuring a structure comprising: (a) suspending a cable-suspended platform from cables in a vicinity of a structure; (b) controlling the cable-suspended platform to move toward the structure; (c) using first and second laser range meters on-board the cable-suspended platform to repeatedly measure first and second distances respectively separating the first and second laser range meters from respective first and second spots on a surface of the structure while the cable-suspended platform is moving; (d) calculating a first separation distance separating the cable-suspended platform from the structure based at least on the first and second distances; (e) determining whether the first separation distance equals a goal offset; (f) controlling the cable-suspended platform to stay at a first location separated from the structure by the first separation distance in response to a determination in step (e) that the separation distance is equal to the goal offset; (g) using a camera on-board the cable-suspended platform to capture a first image of the structure while the cable-suspended platform is at the first location; and (h) displaying the first image on the display screen. In accordance with one embodiment, the method further comprises: computing an orientation angle of a focal axis of the camera relative to a line connecting the first and second spots on the surface of the structure based on the first and second distances; calculating a scale factor for the first image when displayed on the display screen based at least in part on the separation distance and the orientation angle; and displaying a scale indicator overlaid on the image, a value or a length of the scale indicator representing the scale factor.

A further aspect of the subject matter disclosed in detail below is a method for inspecting and measuring a structure comprising: (a) suspending a cable-suspended platform from cables in a vicinity of a structure; (b) controlling the cable-suspended platform to move to and then stay at a location separated from the structure; (c) directing first and second laser pointers pivotably mounted on-board the cable-suspended platform in parallel toward a surface of the structure, the respective pivot axes of the first and second laser pointers being separated by a fixed distance; (d) using the mutually parallel first and second laser pointers to transmit mutually parallel laser beams onto first and second spots respectively while the cable-suspended platform is at the location; (e) using a camera on-board the cable-suspended platform at a first time to capture a first image of a portion of the surface of the structure that includes the first and second spots; (f) pivoting the first and second laser pointers by a predefined angle while the cable-suspended platform is at the location so that the first and second laser pointers are no longer parallel; (g) using the pivoted first and second laser pointers to transmit non-parallel laser beams onto respective third and fourth spots on the surface of the structure while the cable-suspended platform is at the location; (h) using the camera at a second time to capture a second image of the portion of the surface of the structure that includes the third and fourth spots; and (i) processing the first and second images to calculate a first separation distance separating the cable-suspended platform from the structure based on the positions of the third and fourth spots in the images, the predefined angle and the fixed distance separating the pivot axes of the laser pointers. In accordance with one embodiment, step (h) further comprises calculating a second separation distance separating respective centers of the third and fourth spots, the method further comprising calculating a scale factor for the first and second images when displayed on a display screen based on the second separation distance.

Yet another aspect of the subject matter disclosed in detail below is a method for sizing a feature of a structure using a cable-suspended platform comprising a pan-tilt mechanism that supports a camera and a laser range meter, the method comprising: (a) suspending the cable-suspended platform from a plurality of cables supported at respective anchor points of a plurality of anchor points; (b) controlling lengths of paid-out portions of the plurality of cables in a manner that causes the cable-suspended platform to move to a first location; (c) measuring the respective distances of a center point of the cable-suspended platform from the respective anchor points based in part on the lengths of the paid-out portions of the plurality of cables when the cable-suspended platform is at the first location; (d) aiming the laser range meter at a first point corresponding to a first visible feature on a surface of the structure while the cable-suspended platform is at the first location and acquiring a first distance measurement; (e) using the pan-tilt mechanism to measure the respective pan and tilt angles of the laser range meter when the laser range meter is aimed at the first point; (f) converting the distance and angle measurements acquired in steps (d) and (e) into a first vector representing the location of the first point in the frame of reference of the cable-suspended platform; (g) controlling lengths of paid-out portions of the plurality of cables in a manner that causes the cable-suspended platform to move from the first location to a second location; (h) measuring the respective distances of the center point of the cable-suspended platform from the respective anchor points based in part on the lengths of the paid-out portions of the plurality of cables when the cable-suspended platform is at the second location; (i) aiming the laser range meter at a second point corresponding to a second visible feature on the surface of the structure while the cable-suspended platform is at the second location and acquiring a second distance measurement; (j) using the pan-tilt mechanism to measure the respective pan and tilt angles of the laser range meter when the laser range meter is aimed at the second point; (k) converting the distance and angle measurements acquired in steps (i) and (j) into a second vector representing the location of the second point in the frame of reference of the cable-suspended platform; (l) generating a transformation matrix representing a position difference and an orientation difference between the first and second locations of the cable-suspended platform based on information acquired in steps (c) and (h); (m) multiplying the second vector by the transformation matrix to form a third vector representing the location of the second point in the frame of reference of the cable-suspended platform at the first location; and (n) calculating a distance between the first and second points using the first and third vectors.

In accordance with one embodiment, the method described in the preceding paragraph further comprises: (o) transmitting one or more messages containing measurement data from the cable-suspended platform; (p) receiving the one or more messages at a control station; and (q) extracting the measurement data from the message, wherein steps (f) and (k) through (n) are performed by a computer system at the control station. This method may further comprise: using the camera to capture an image of a portion of the surface of the structure that includes the first and second visible features while the cable-suspended platform is at the first location; and displaying the image and symbology representing a value of the distance calculated in step (n) overlaid on the image on a display screen. For example, the first and second visible features may be respective endpoints of an anomaly in the structure.

A further aspect of the subject matter disclosed herein is a system for inspecting and measuring a structure comprising: at least two anchor points; at least two pulleys, each pulley being supported by a respective anchor point; at least two spools; at least two spool motors, each spool motor being operatively coupled for driving a respective spool to rotate; at least two rotational encoders, each rotational encoder being operatively coupled to detect incremental angular movements of a respective spool; a platform comprising a rigid support structure, a pan-tilt mechanism mounted to the rigid support structure, a camera mounted to the pan-tilt mechanism, and a laser range meter mounted to the camera; at least two cables connected to the rigid support structure, each cable having a first portion wrapped around a respective spool and a second portion in contact with a respective pulley; a computer system configured to control operation of the pan-tilt mechanism and the spool motors and to selectively activate the camera and laser range meter; and a transceiver configured to enable communication between the computer system and a control station. The computer system is further configured to: receive image data from the camera, pan and tilt angle data from the pan-tilt mechanism, distance data from the laser range meter, and rotation data from the rotational encoders; determine a first location of the platform relative to a structure; and send commands for controlling the spool motors in a manner that causes the platform to move from the first location to a second location whereat the camera is separated from a surface of the structure by a goal offset.

In accordance with one embodiment of the system described in the preceding paragraph, the rigid support structure comprises an equipment support member and a cable attachment ring affixed to or integrally formed with the equipment support member, and the number of cables attached to the cable attachment ring is at least three. In accordance with another embodiment of the system described in the preceding paragraph, the rigid support structure comprises an equipment support member and a trolley affixed to or integrally formed with the equipment support member, the number of cables attached to the trolley is two, and the number of anchor points is two, further comprising a third cable connecting the two anchor points, and wherein the trolley comprises first and second rollers that roll on the third cable.

Other aspects of systems and methods for acquiring three-dimensional coordinates of points or scale and point-to-point distance information for objects in an environment using a remotely operated cable-suspended platform are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 2A is a block diagram identifying some components of the camera-equipped cable-suspended platform depicted in FIG. 1.

FIG. 2B is a block diagram identifying other components of the system depicted in FIG. 1.

FIG. 8 is a diagram showing a top view of a video camera having a pair of laser pointers (a first color) and a pivotable (about a single axis) third laser pointer (a second color) directed at a target object in accordance with a further embodiment.

FIGS. 21-23 are diagrams referred to in the Appendix, where an illustrative method for calculating a calibration matrix for coordinate system transformation is described.

Reference will hereinafter be made to the drawings in which similar elements in different drawings bear the same reference numerals.

DETAILED DESCRIPTION

For the purpose of illustration, systems and methods for acquiring three-dimensional coordinate information, scale, or point-to-point distance information for objects undergoing measurement or non-destructive inspection using a cable-suspended platform will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
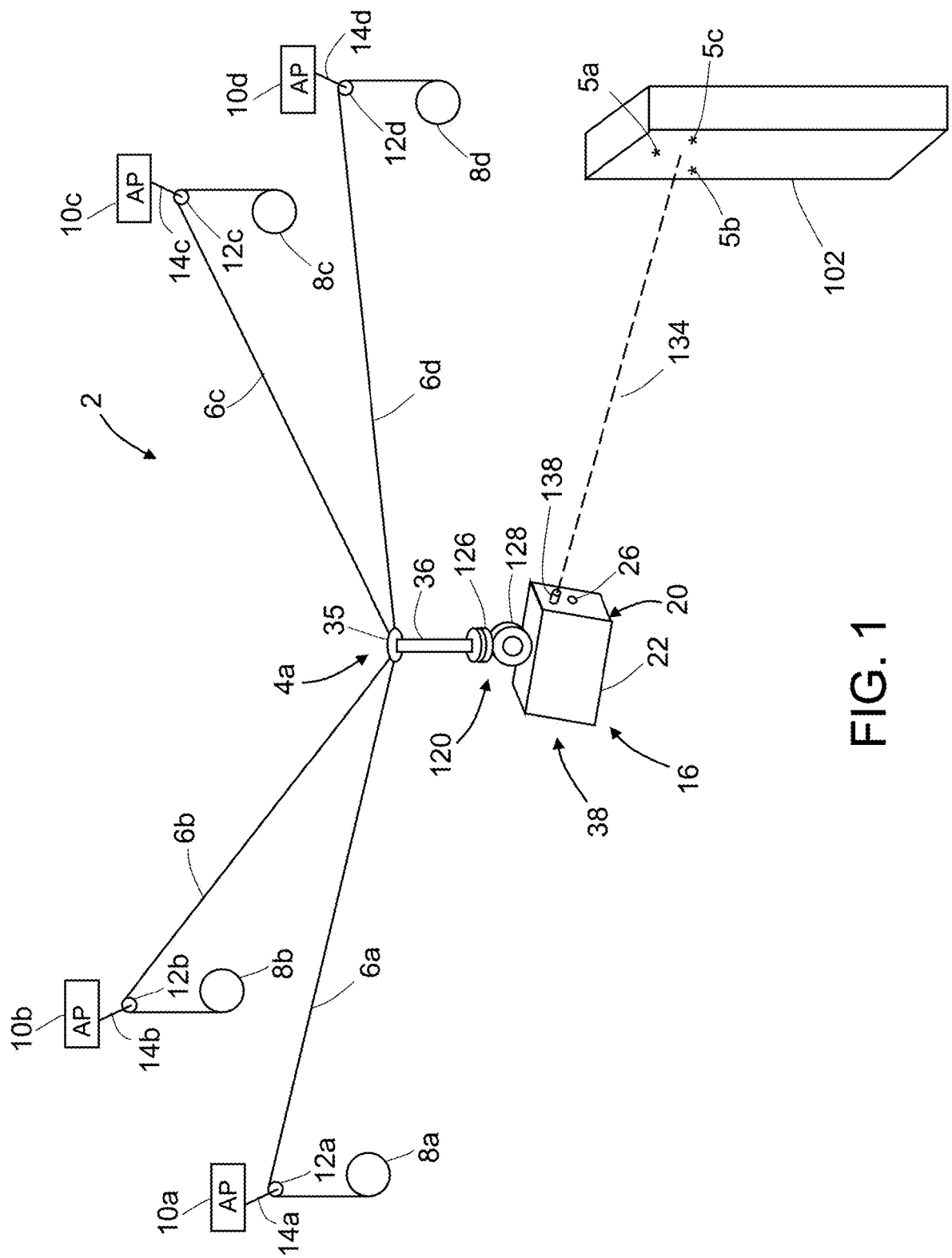
FIG. 1 is a diagram showing a system for inspecting and measuring a target object using a camera-equipped cable-suspended platform in accordance with some embodiments.

FIG. 1 is a diagram showing some components of a measurement system 2 in accordance with some embodiments for inspecting and measuring a target object 102. The measurement system 2 includes a cable-suspended platform 16 that may be moved around a structure (e.g., target object 102) requiring periodic inspection. The measurement system 2 can be adapted for use in inspecting a wide range of target objects, including aircraft. The measurement system 2 is particularly well suited for use inside large buildings such as manufacturing facilities and warehouses.

In accordance with the measurement system 2 depicted in FIG. 1, the cable-suspended platform 16 is suspended from four cables 6a-6d. More specifically, the cable-suspended platform 16 comprises a rigid support structure 4a. In accordance with one embodiment, the rigid support structure 4a comprises an equipment support member 36 having a cable attachment ring 35 affixed thereto or integrally formed therewith. The ends of the cables 6a-6d are attached to the cable attachment ring 35. The cables 6a-6d are paid out or pulled in by respective motor-driven spools 8a-8d of respective winch units (described in some detail below with reference to FIG. 2B), with the paid-out portions of the cables being passed over respective pulleys 12a-12d. The pulleys 12a-12d are in turn rotatably coupled to respective yokes 14a-14d which are rigidly connected to respective anchor points 10a-10d.

The anchor points 10a-10d may be attached to walls or ceilings for indoor applications or mounted on poles or cranes for outdoor applications. The anchor points 10a-10d need not be located in the same plane. As long as the locations of the spools 8a-8d and the lengths of the paid-out portions of cables 6a-6d are known, the computer system (not shown in FIG. 1) that controls movement of the cable-suspended platform 16 can be configured to track the location of the center of the cable attachment ring 35 in the frame of reference of the anchor points. Nor is the measurement system 2 limited to the use of four anchor points. For example, three anchor points are sufficient and more than four can be utilized.

In accordance with the embodiment depicted in FIG. 1, the cable-suspended platform 16 further comprises a local positioning system 38 attached to a bottom end of the equipment support member 36. The local positioning system 38 comprises: a pan-tilt mechanism 120 mounted to the bottom end of the equipment support member 36; a camera 20 mounted to the pan-tilt mechanism 120 and having a camera aperture 26; and a laser range meter 138 for projecting a laser beam along an aim direction vector 134 (indicated by a dashed line in FIG. 1) onto the target object 102 to form a laser spot (not shown in FIG. 1) on a surface of the target object 102. The pan-tilt mechanism 120 comprises a pan unit 126 and a tilt unit 128. The camera 20 comprises a housing 22 to which the laser range meter 138 is mounted.

The camera 20 may comprise a still camera (color and/or black and white) to obtain still images, a video camera to obtain color and/or black and white video, or an infrared camera to obtain infrared still images or infrared video of the target object 102. It may be possible to have a single camera that can perform the functions of all of these types. The local positioning system 38 comprises a computer system (not shown in FIG. 1, but see computer system 162 in FIG. 14) which is configured to measure coordinates of points on the target object 102 defined in the local coordinate system of the target object 102. In particular, the computer system is programmed to control motions of the pan-tilt mechanism 120 to rotationally adjust the camera 20 to selected angles around the vertical, azimuth (pan) axis and the horizontal, elevation (tilt) axis. The computer system is also programmed to control operation of the camera 20 and receive image data therefrom for transmission to the control station. The computer system is further programmed to control operation of the laser range meter 138 and receive range data therefrom for transmission to the control station.

The on-board system of the cable-suspended platform 16 may further comprise a wireless transceiver and an antenna (not shown in FIG. 1) to enable bidirectional, wireless electromagnetic wave communications with a control station 150 (see FIG. 2B).

The measurement system 2 disclosed herein leverages existing local coordinate measurement and remote operation techniques, specifically the capabilities of the local positioning systems described U.S. Pat. Nos. 9,285,296, 8,447,805 and 7,859,655, the disclosures of which are incorporated by reference herein in their entireties. The image data acquired by the video camera of the local positioning system may undergo image processing as disclosed in U.S. Pat. No. 8,744,133.

Still referring to FIG. 1, an aim direction vector 134 that describes the orientation of the laser range meter 138 relative to a fixed coordinate system of the cable-suspended platform 16 is determined from the azimuth and elevation angles. Using the laser range meter 138, the orientation of the aim direction vector 134 in the instrument coordinate system is measured when the laser beam emitted by the laser range meter 138 is in turn aligned with each of three calibration points 5a-5c on the surface of the target object 102, wherein positions of the three calibration points 5a-5c in the target object coordinate system are known. This method also includes measuring a distance (i.e., range) substantially along the aim direction vector 134 from the laser range meter 138 to each of the three calibration points 5*a*-5*c*. This method also includes calculating a calibration matrix which transforms a position defined in the instrument coordinate system to a position defined in the target object coordinate system using at least the measured orientation and distance in the instrument coordinate system corresponding to the three calibration points 5*a*-5*c* and the known positions of the three calibration points 5*a*-5*c* in the target object coordinate system.

The control station 150 (see FIG. 2B) comprises a computer system that is programmed with three-dimensional localization software that is used to process the range data received from the computer system 162 onboard the cable-suspended platform 16. For example, the three-dimensional localization software may be of a type that uses multiple calibration points 5*a*-5*c* on the target object 102 (such as points or features on a surface on an aircraft) to define the location (position and orientation) of camera 20 relative to target object 102. The calibration points 5*a*-5*c* may be visible features of known position (such as the corner of a window frame, a screw used to attach the pitot tube, etc.) in the local coordinate system of the target object 102 as determined from a three-dimensional database of feature positions (e.g., a CAD model) or other measurement technique. During the process of calibrating the local positioning system, X,Y,Z data for at least three non-collinear points are extracted from the CAD model or other source of three-dimensional data. Typically calibration points 5*a*-5*c* are selected which correspond to features that can be easily located on the target object. The three-dimensional localization software utilizes the calibration points 5*a*-5*c* and the pan and tilt data from the pan-tilt mechanism 120 to define the relative position and orientation of the camera 20 with respect to the local coordinate system of the target object 102 (described in more detail below). The measured distances to the calibration points 5*a*-5*c* may be used in coordination with the azimuth and elevation angles from the pan-tilt mechanism 120 to solve for the camera position and orientation relative to the target object 102. Further details concerning a methodology for generating a camera pose transformation matrix reflecting the position and orientation of a camera relative to a coordinate system of a target object are set forth in the Appendix.

Once the position and orientation of the camera 20 with respect to the target object 102 have been determined, the onboard computer system 162 may be operated to rotate and zoom the optical image field of the camera 20 to a point of interest of unknown coordinate position on the target object 102, which may be a damage/repair location on an aircraft, for example. At this position of the aim direction vector 134, the orientation of the camera 20 (which may include the respective angles of the camera 20 along the azimuth axis and the elevation axis) may be recorded. By using the azimuth and elevation angles from the pan-tilt mechanism 120 and the relative position and orientation (i.e., relative location) of the camera 20 determined in the calibration process, the location of the point of interest can be determined relative to the coordinate system of the target object 102. The damage/repair location on the target object 102 may be sized using techniques which are described in some detail below. In the case of a crack, the length of the crack may be measured.

The reverse process, in which the position of a point of interest may be known in the target object's coordinate system (from a previous data acquisition session, a CAD model, or other measurement), can also be performed. In this situation, the camera 20 may be placed in any location on the work area where calibration points 5*a*-5*c* are visible (which may be in a different location than the location where the original data was recorded) and the instrument-to-target calibration step may be performed. This calibration is referred to herein as "the camera pose", but it is associated with more than just the camera; for example, it may also include instrumentation for measuring distance (such as a laser range meter). The direction vector from the point of interest to the camera 20 may be calculated in the target object's coordinate system. The inverse of the camera pose transformation matrix may be used to convert the direction vector into the coordinate system of the cable-suspended platform 16. The azimuth and elevation angles may then be calculated and used by the pan-tilt mechanism 120 to aim the camera 20 at the point of interest on the target object 102.

In a typical implementation, the local positioning system may be set up within about 10-50 feet of the target object 102. The target object 102 may, for example, be a structure such as a storage tank or a large vehicle such as an aircraft. The calibration points 5*a*-5*c* on the target object 102 may be selected and used by the three-dimensional localization software in conjunction with the pan and tilt data (i.e., azimuth and elevation angles) from the pan-tilt mechanism 120 and distance data from the laser range meter 138 to determine the position and orientation of the camera 20 with respect to target object 102. The calibration points 5*a*-5*c* may be feature points of known position in the local coordinate system of the target object 102 as determined from a three-dimensional CAD model or other measurement technique.

As should be apparent from the above description of the process for calibrating the location of the cable-suspended platform 16 in the frame of reference of a target object 102 having three calibration points 5*a*-5*c* with known local coordinates, in the alternative the location of the cable-suspended platform 16 can be calibrated in the frame of reference of the measurement system 2. In this case, the anchor points 10*a*-10*d* may be used as calibration points. To calibrate the system using the known locations of the anchor points 10*a*-10*d*, the cable-suspended platform 16 is moved to a position where at least three of the anchor points 10*a*-10*d* can be targeted by the laser range meter 138. Distance and pan-tilt angle data is acquired for the three anchor points and then compared to the known coordinates of those anchor points using a vector-based approach.

An enhanced type of calibration for the entire working volume (or a portion of the working volume) of the measurement system 2 can also be performed in order to compensate for cable stretch. For example, the calibration process described above can be performed for the eight corners of a virtual bounding box surrounding the expected measurement volume. This data is then compared to data for the same points calculated by a cable length-based 3-D positioning method (described by equations set forth below). One simple way to use the eight-corner calibration data is to perform a tri-linear interpolation at run-time to provide a correction amount to adjust the value measured by the cable length-based process. (There are other interpolation approaches using cable length data that could also be used.)

The laser range meter 138 (also called "a laser range finder" and "laser distance meter") is affixed to the camera 20 to create a laser hybrid system. Measurement data from the laser range meter 138 can be used to obtain estimates of the respective distances from the laser range meter 138 (and from the camera 20 to which the laser range meter is fixed) to calibration points on a target object. A typical laser range meter comprises a laser diode which transmits a bundled, usually visible, laser beam toward a surface of a target object. The light which is backscattered and/or reflected by the target object is imaged on the active surface of a photoreceiver by receiving optics. The laser diode has a position and an orientation which are fixed relative to the position and orientation of the video camera; the photoreceiver has a position and an orientation which are fixed relative to the position and orientation of the laser diode. The time-of-flight between transmission and reception of the light can be used to calculate the distance between the laser range meter and the portion of the target object surface on which the transmitted beam impinged. The laser range meter also functions as a laser pointer. Alternatively, a distance meter which directionally projects wave energy other than a laser beam could be utilized.

For the sake of completeness, it may be noted that the foregoing methods for determining the three-dimensional coordinates of a point of interest on a target object relative to a frame of reference using the cable-suspended platform 16 depicted in FIG. 1 have the following steps in common: (a) suspending the cable-suspended platform 16 from a plurality of cables 6a-6d connected to the equipment support member 36 and supported at respective anchor points of a plurality of anchor points 10a-10d; (b) calibrating the pan-tilt mechanism 120 relative to the frame of reference; (c) controlling lengths of paid-out portions of the plurality of cables 6a-6d in a manner that causes the equipment support member 36 to move so that the camera 20 is within range of a target object 102; (d) measuring the respective distances of a center point of the equipment support member 36 from the respective anchor points 10a-10d based in part on the lengths of the paid-out portions of the plurality of cables 6a-6d; (e) controlling the pan-tilt mechanism 120 to cause the laser range meter 138 to aim at a point of interest on the target object 102; (f) measuring the pan and tilt angles of the pan-tilt mechanism 120 while the laser range meter 138 is aimed at the point of interest; (g) measuring the distance separating the laser range meter 138 and the point of interest; and (h) converting the distance and angle measurements into a Cartesian coordinate vector representing the location of the point of interest in the frame of reference.

In accordance with one embodiment of the method described in the preceding paragraph, the frame of reference is a frame of reference of the target object 102, and step (b) comprises: aiming the laser range meter 138 at three or more calibration points 5a-5c on the target object 102 at different times while the equipment support member 36 is stationary; and computing a calibration matrix representing a transformation from a frame of reference of the pan-tilt mechanism 120 to the frame of reference of the target object 102. In one proposed implementation, step (b) further comprises: measuring the pan and tilt angles of the pan-tilt mechanism 120 while the laser range meter 138 is aimed at each calibration point 5a-5c; and measuring the distance separating the laser range meter 138 and each calibration point 5a-5c while the laser range meter 138 is aimed at each calibration point 5a-5c.

In accordance with an alternative embodiment, the frame of reference is a frame of reference of a plurality of at least three non-collinear anchor points of the plurality of anchor points 10a-10d supporting respective cables of the plurality of cables 6a-6d, and step (b) comprises: aiming the laser range meter 138 at three or more anchor points of the plurality of anchor points 101-10d at different times while the equipment support member 36 is stationary; and computing a calibration matrix representing a transformation from a frame of reference of the pan-tilt mechanism 120 to the frame of reference of the plurality of anchor points 10a-10d. In one proposed implementation, step (b) further comprises: measuring the pan and tilt angles of the pan-tilt mechanism 120 while the laser range meter 138 is aimed at each anchor point; and measuring the distance separating the laser range meter 138 and each anchor point while the laser range meter 138 is aimed at each anchor point.

FIG. 2A identifies some components of the cable-suspended platform 16, including a counterbalance weight 30 not shown in FIG. 1. The counterbalance weight 30 is connected to the top end of the equipment support member 36, while the pan-tilt mechanism 120 is connected to the bottom end of the equipment support member 36. The counterbalance weight 30 provides an inert mass to balance the rotational inertia of the camera 20. Preferably the center of the cable attachment ring is approximately collocated with the center of gravity of cable-suspended platform 16 to minimize undesired rotational or pendular motion of cable-suspended platform 16 as it is being moved by the extension and/or retraction of one or more of the supporting cables 6a-6d. In addition, a gyroscope may be incorporated in the counterbalance weight 30 or other locations on the platform to stabilize the orientation of the equipment support member 36. The system stays vertical because of gravity. While there is a counterbalance weight 30 on top, it is not as heavy as the payload below the cable supports. The gyroscope ensures the orientation does not change as the system is moving. A mechanical gyroscope has one or more fast spinning disks that allow the system to maintain orientation. In basic implementations, this type of gyroscopic stabilization can be accomplished passively without computer control. The spinning disks could also be part of the counterbalance weight 30. In solid-state gyroscopic devices (such as MEMS-based inertial measurement units), the gyroscope measures rotation rates and then motors are used to correct the orientation of the system (a microprocessor or computer of some type would be configured to send commands to respective motor controllers in this variation). FIG. 2B is a block diagram identifying additional components of each winch unit incorporated in the measurement system 2 depicted in FIG. 1. Each winch unit comprises a motor-driven spool 8 for supporting a respective one of the cables 6a-6d and a cable guide 24 which guides the cable onto and along the length of the spool 8 during winding. Each spool 8 is driven to rotate by a respective spool motor 116. Each cable guide 24 is a mechanical device that moves based on gearing to the same spool motor 116 that drives the spool 8. The spool motors 116 are under the control of respective motor controllers 114 that receive commands from a winch unit control computer 112. The winch unit control computer 112 coordinates the rotation of each spool 8 by sending appropriate commands to the associated motor controllers 114.

Each spool 8 has an associated rotational encoder 118 that outputs signals representing incremental angular rotations of the spool 8. The length of each cable which has been paid out from each spool 8 can be determined by the winch unit control computer 112 based in part on feedback from the respective rotational encoder 118.

The winch unit control computer 112 communicates (via wired connections or wirelessly) with a control station 150 by way of transceivers 160a and 160b. In response to commands input by a system operator via a user interface at the control station 150, the control station 150 sends commands to the winch unit control computer 112 via transceivers 160a and 160b for controlling the movement of the cable-suspended platform 16. The winch unit control computer 112 in turn sends commands to the motor controllers 114 for extending and/or retracting the cables 6a-6d by operation of the motor-driven spools 8. Preferably all of the spool motors 116 are run by the same high-level computer/operator interface. When all motors 116 are operated by the same computer (e.g., winch unit control computer 112), the computer can be configured to use inverse kinematics to direct the position and orientation of the cable-suspended platform 16 simultaneously—which means that one can specify a location (position and orientation), such as with a 4×4 transformation matrix, and then have the system move everything at once to exactly the right place.

The exact position of the center of the cable attachment ring 35 can be tracked by configuring the winch unit control computer 112 to calculate the respective lengths of the paid-out portions of cables 6a-6d by counting the pulses output by the respective rotational encoders associated with each spool 8 (i.e., spools 8a-8d). Regarding the cable winding on each spool 8, if done correctly it is possible to accurately compute the length of the paid-out (i.e., unwound) portion of the cable. As the spool 8 rotates, the associated rotational encoder generates a pulse for each incremental change in angular position during spool rotation in either direction. However, the amount of cable paid out or wound up per incremental rotation will vary as a function of the number of layers of cable wound on the spool. One way that this can be addressed is by managing the way the cable wraps on the spool so that the cable wraps are right next to each other instead of randomly wrapped on the spool 8. This is usually managed by the cable guide 24, which moves back and forth along the width of the spool 8. When the cable arrives at one end of the spool 8, the cable guide 24 reverses direction and puts the cable on the next level above the previous level, but if the system counts the number of levels of cable on the spool 8, then the system can modify the effective diameter variable associated with the spool 8 (with cable on it) which allows the system to calculate the correct value for the incremental length of cable paid out from or wound up on the spool 8 per incremental rotation of the spool 8.

Figure 2C:
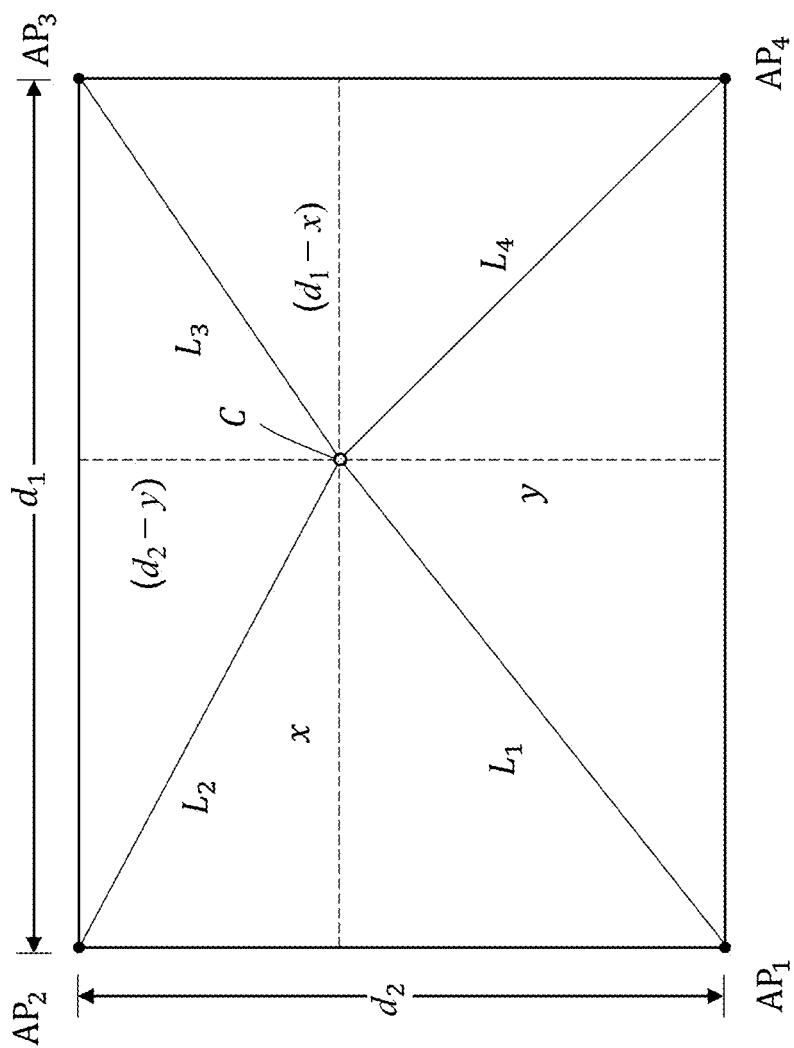
FIG. 2C is a diagram representing a top view of a platform suspended from four cables supported by respective anchor points that lie in a plane in a rectangular arrangement. Various dimensions of interest are indicated.

FIG. 2C is a diagram representing a top view of a center point C of a platform suspended from four cables supported by respective anchor points $AP_1$ through $AP_4$ that lie in a plane in a rectangular arrangement. In this example, anchor point $AP_1$ is separated from anchor point $AP_2$ by a distance $d_2$; anchor point $AP_2$ is separated from anchor point $AP_3$ by a distance $d_1$; anchor point $AP_3$ is separated from anchor point $AP_4$ by distance $d_2$; and anchor point $AP_4$ is separated from anchor point $AP_1$ by distance $d_1$. The cables connecting the cable-suspended platform to the four anchor points $AP_1$ through $AP_4$ have respective cable lengths $L_1$, $L_2$, $L_3$ and $L_4$. (Note: In the case where the ends of the cables are attached to a ring having a radius R, the respective cable lengths $L_1$, $L_2$, $L_3$ and $L_4$ as used in the equations will each be the sum of the actual length of the cable extending from the respective anchor point to the respective attachment point on the cable attachment ring and the radius R.)

At any given instant in time, the control station 150 has information from the rotational encoders 118 indicating the cable lengths $L_1$, $L_2$, $L_3$ and $L_4$. These measurements can be used to compute the three-dimensional position (x, y, z) of the center point C (note that with the z (vertical) dimension is not shown in FIG. 2C) in the frame of reference of the measurement system 2. To accomplish the foregoing, the following forward kinematics (constraint) equations are used:

$$L_1^2 = x^2 + y^2 + z^2$$

$$L_2^2 = x^2 + (d_2-y)^2 + z^2$$

$$L_3^2 = (d_1-x)^2 + (d_2-y)^2 + z^2$$

$$L_4^2 = (d_1-x)^2 + y^2 + z^2$$

These equations form a set of non-linear simultaneous equations. From inverse kinematics, one can derive the resulting closed-form x, y, z solution:

$$x = \frac{L_2^2 - L_3^2 + d_1^2}{2d_1}$$

$$y = \frac{L_1^2 - L_2^2 + d_2^2}{2d_2}$$

$$z = \pm\sqrt{L_4^2 - d_1^2 + 2d_1 x - x^2 - y^2}$$

In a right-handed coordinate system (with z in the up direction), the z equation that should be used is the negative one:

$$z = -\sqrt{L_4^2 - d_1^2 + 2d_1 x - x^2 - y^2}$$

Thus for any point of interest on the target object 102, the computer system at the control station 150 may be configured with position computation software that enables determination of the three-dimensional coordinates of that point of interest in the coordinate frame of reference of the measurement system, and also enables determination of the position of the center point C of the cable-suspended platform 16 in the coordinate frame of reference of the measurement system, and the pan and tilt angles of the pan-tilt mechanism 120 which would result in the generation of a laser beam by the laser range meter 138 that impinges on that point of interest.

Cable-suspended platforms of the type depicted in FIG. 1 may further include the capability to acquire scale, and point-to-point distance information for objects undergoing measurement or non-destructive inspection. The cable-suspended platform may be provided with on-board sensors and processing techniques to provide discrete or continuous measurements of the distances between points on a target object or the scale of the target object. The acquisition of such distance and scale measurement data will be divided into the following three categories.

In one category of embodiments, a gimbaled video camera and two or more laser pointers mounted thereto are used to acquire the information to compute: distance to the target, a reference scale for the view of the target, and in some embodiments, distance between points of interest on the target. This category of embodiments is applicable to situations where the target surface is relatively flat and perpendicular to the aim direction of the laser pointers and camera. As used herein, the term "laser pointer" means a device that emits a laser beam and does not detect returned laser light.

Another category of embodiments of the concept are configurations where two or more laser range meters are mounted to a gimbaled video camera to enable: three-dimensional coordinate measurement of points of interest on the target, direct measurement of distance to the target, reference scale, as well as one or more orientation angle of the video camera relative to the target. If three non-collinearly mounted laser range meters are used, more than one orientation angle can be measured (for example, yaw and pitch). As used herein, the term "laser range meter" (also known as "laser rangefinder") means a device that emits a laser beam and detects returned laser light.

A third category of embodiments includes a gimbaled video camera and a single laser range meter mounted thereto used to acquire distance and aim direction information from the cable-suspended platform to target objects in the environment. This concept leverages some aspects of the vector-based measurement algorithms disclosed in U.S. Pat. No. 7,859,655 (the disclosure of which is incorporated by reference herein in its entirety), along with the addition of sensors, such as cable length rotational encoders and system configuration (kinematics), to determine the relative position of the cable-suspended platform relative to the environment. This platform motion data along with the aim direction and distance data from the laser range meter can be used to acquire measurements of objects in the environment.

Example embodiments of the foregoing types of enhanced-capability cable-suspended platforms will now be described in some detail. For the purpose of illustration, it will be assumed that the platform comprises a video camera 130 having various laser devices affixed thereto (e.g., affixed to a camera housing 22).

Figure 3:
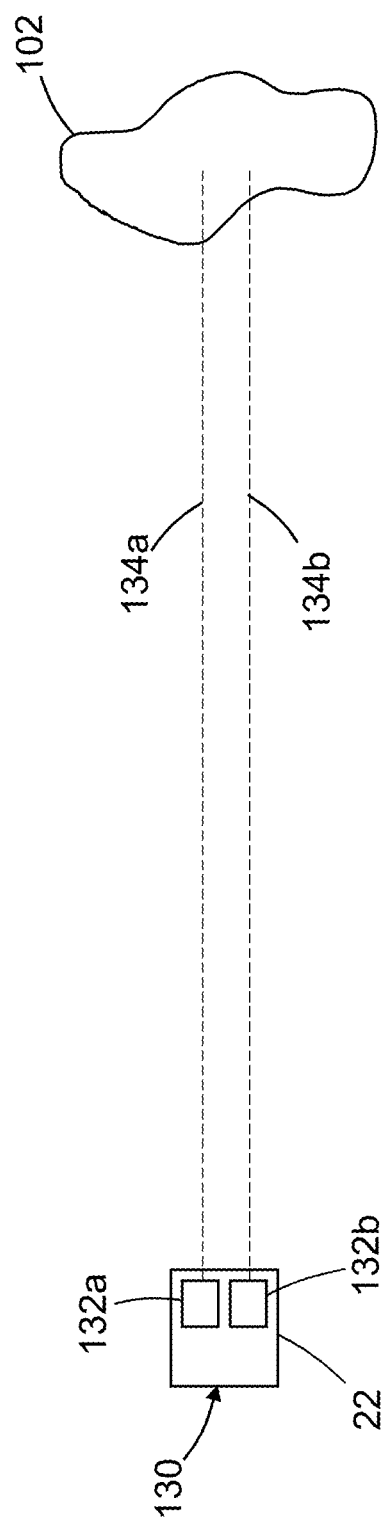
FIG. 3 is a diagram showing a top view of a video camera having a pair of laser pointers directed at a target object in accordance with one embodiment.

FIG. 3 is a diagram showing a top view of a video camera 130 having a pair of laser pointers 132a and 132b affixed thereto and directed at a target object 102 in accordance with one embodiment, which video camera 130 can be incorporated in the cable-suspended platform 16 depicted in FIG. 1. Such a system is capable of acquiring scale and point-to-point distance information for objects undergoing non-destructive inspection. The laser pointers 132a and 132b are mounted to the housing 22 of the video camera 130 in a parallel configuration. Preferably the focal axis of the video camera 130 and the aim directions of the laser pointers 132a and 132b are mutually parallel. The laser pointers 132a and 132b and the video camera 130 are used to calculate distance to target object 102 and reference scale. This embodiment is used for situations where the cable-suspended platform 16 is relatively close to the target object 102.

When activated, the laser pointers 132a and 132b direct respective mutually parallel laser beams along respective optical paths indicated by respective aim direction vectors 134a and 134b in FIG. 3, which laser beams form respective laser spots on a surface of the target object 102. The video camera 130 may be activated to capture an image in which the two laser spots are visible. This image data can be processed (as described in some detail below) to derive pixel information which, in conjunction with the known distance separating the axes of the two laser pointers 132a and 132b, can be used to determine a scale factor. That scale factor can then be used to display a scale indicator on any subsequent image captured by the video camera 130 while the cable-suspended platform 16 is at the same location. More specifically, one goal is to determine the distance D between the pointers 132a and 132b and the target object 102, as will be described in more detail below with reference to FIGS. 5A and 5B.

Figure 4:
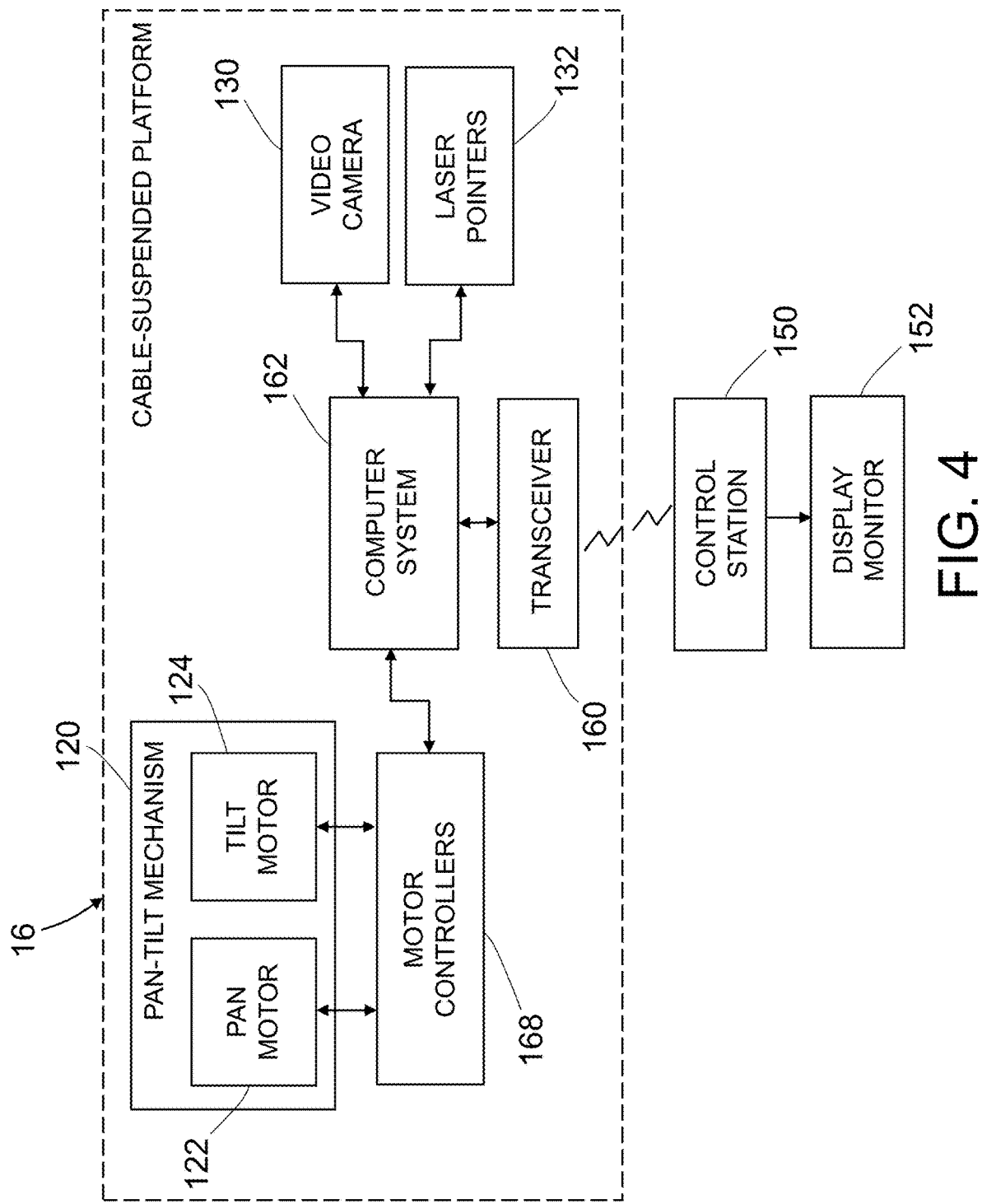
FIG. 4 is a block diagram identifying some components of a system for performing non-destructive inspection of a structure using a remote-controlled cable-suspended platform having two or more laser pointers. The configuration of the laser pointers may be selected from the alternative embodiments depicted in FIGS. 3, 6 and 8.

FIG. 4 is a block diagram identifying some components of a system for performing non-destructive inspection of a structure using a remote-controlled cable-suspended platform 16 having two or more laser pointers 132 (e.g., a first laser pointer 132a and a second laser pointer 132b as seen in FIG. 2) mounted thereon. In this example, the components of the local positioning system 38 are controlled by an on-board computer system 162, which may be configured with programming stored in a non-transitory tangible computer-readable storage medium (not shown). In particular, the computer system 162 may be programmed to execute radiofrequency commands received from the control station 150. Those radiofrequency commands are received by a transceiver 160 on-board the cable-suspended platform 16, converted into the proper digital format and then forwarded to the computer system 162.

The control station 150 may comprise a general-purpose computer system configured with programming for controlling operation of the cable-suspended platform 16 by sending commands to the winch unit control computer 112 (not shown in FIG. 4, but see FIG. 2A), as previously described, and for controlling various components of the local positioning system 38. For example, the control station 150 may send commands controlling the movements of the cable-suspended platform 16 and the pan-tilt mechanism 120 and commands for activation of the laser pointers 132 and the video camera 130. In addition, the computer system at the control station 150 is configured with programming for processing data received from the cable-suspended platform 16 during an inspection operation. In particular, the computer system of the control station 150 may comprise a display processor configured with software for controlling a display monitor 152 to display images captured by the video camera 130. The optical image field, as sighted by the video camera 130, can be displayed on the display monitor 152. More specifically, in response to commands from the control station 150, the computer system 162 sends control signals for activating the video camera 130 and the laser pointers 132 (e.g., via electrical cables). The video camera 130 may have automated (remotely controlled) zoom capabilities. The computer system 162 also controls the rotations of the pan unit 126 and tilt unit 128 (see FIG. 1) of the pan-tilt mechanism 120 by sending commands to the motor controllers 168 which respectively control a pan motor 122 and a tilt motor 124.

In accordance with one embodiment, the pan-tilt mechanism 120 comprises a pan unit 126 configured to rotate the video camera 130 (and laser devices mounted thereto) about a pan axis and a tilt unit 128 configured to rotate the video camera 130 about a tilt axis (orthogonal to the pan axis) in response to control signals received from the computer system 162. Actuators (not shown in the drawings), such as servo-motors or the like, in the pan-tilt mechanism 120 may receive and respond to control signals from the computer system 162 by adjusting the angular rotation of the video camera 130 about the pan and tilt axes, as well as the angular speed at which the video camera 130 rotates about the pan and tilt axes. The pan-tilt mechanism 120 further comprises pan and tilt rotational encoders (not shown in the drawings) that send signals representing current angular position data back to the computer system 162. The control signals applied to the pan-tilt mechanism 120 may be computed by the computer system 162 in response to user instructions (e.g., manipulation of an input device that is part of the control station 150) or an automatic scan path generator.

Figure 5A:
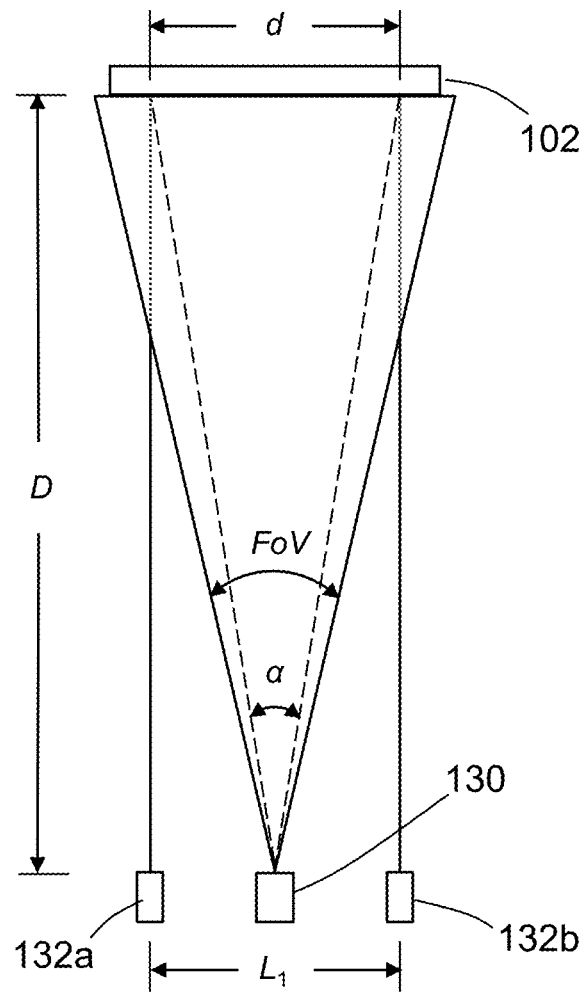
FIG. 5A is a diagram showing a video camera and a pair of laser pointers separated from a target object by a distance D, which laser pointers produce respective laser spots separated by a distance d on the surface of the target object.
Figure 5B:
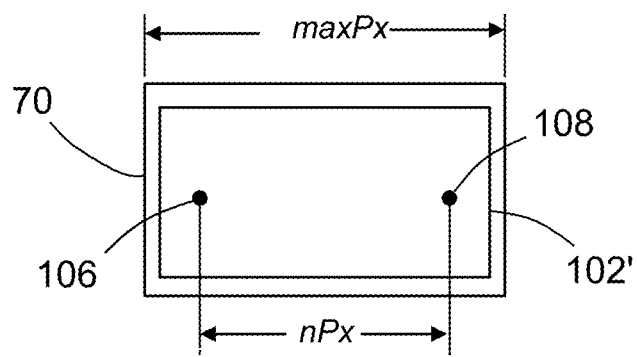
FIG. 5B is a diagram representing an image acquired by the video camera depicted in FIG. 5A, which image contains a representation of the target object.

FIG. 5A is a diagram showing a video camera 130 and a pair of laser pointers 132a and 132b separated from a target object 102 by the distance D, which laser pointers produce respective laser spots on the surface of the target object 102. These laser spots on the target object surface are separated by the distance d. FIG. 5B is a diagram representing an image 70 acquired by the video camera 130 depicted in FIG. 5A, which image 70 includes a representation 102' of the target object 102 and representations of the respective positions 106 and 108 of the laser spots.

In accordance with the situation depicted in FIGS. 5A and 5B, the known variables are the current field-of-view of the video camera 130 (i.e., "FoV" in FIG. 5A), the maximum number of pixels in the width direction of the image 70 (i.e., "maxPx" in FIG. 5B), the number of pixels in the image 70 between the respective groups of pixels representing positions 106 and 108 of the laser spots produced by laser pointers 132a and 132b (i.e., "nPx," in FIG. 5B); and the distance separating the laser pointers 132a and 132b (i.e., "L₁" in FIG. 5A). The unknown variables are the viewing angle α between the laser spots and the distances D and d.

The viewing angle α between the laser spots can be computed using the camera field-of-view (FoV) and image pixel data:

$$\alpha = 2 * \operatorname{atan}\left(\frac{nPx}{maxPx} * \tan\left(\frac{FoV}{2}\right)\right) \quad (1)$$

where nPx is the measured number of pixels between laser spots, and maxPx is the image width in pixels. Then the distances d and D can be computed using the following equations:

$$d = L_1$$

$$D = \frac{L_1/2}{\tan(\alpha/2)}$$

Substituting Eq. (1) for the viewing angle α, one obtains:

$$D = \frac{L_1/2}{\frac{nPx}{maxPx} * \tan\left(\frac{FoV}{2}\right)}$$

In accordance with the embodiment depicted in FIGS. 3 and 5A (and other embodiments described hereinafter), the value of the distance D is updated continuously.

In accordance with one possible implementation, the value of the distance d may be included anywhere in the image 70 displayed on the display monitor 152. In accordance with another possible implementation, a scale factor can be calculated based on a ratio of the distance d and the number of pixels nPx and a scale bar or other scale indicator indicating the scale factor can be included as part of the image 70. This scale indicator will be accurate so long as the cable-suspended platform-target object separation distance D is up-to-date. As that separation distance changes, the operations described above can be repeated to generate an updated scale factor. Over time, the scale indicator is repeatedly adjusted as a function of the variable distance separating the cable-suspended platform 16 and the target object 102.

For the purpose of non-destructive inspection, preferably the acquired images of the inspected structure do not include representations of laser spots. Accordingly, following the initial sizing of the imaged surface area of the target object 102, the video camera 130 can be activated to capture additional images (e.g., a video sequence of images) while the laser pointers 132a and 132b are de-activated. In this case, the video camera 130 preferably captures images while the separation distance D is up-to-date.

Figure 6:
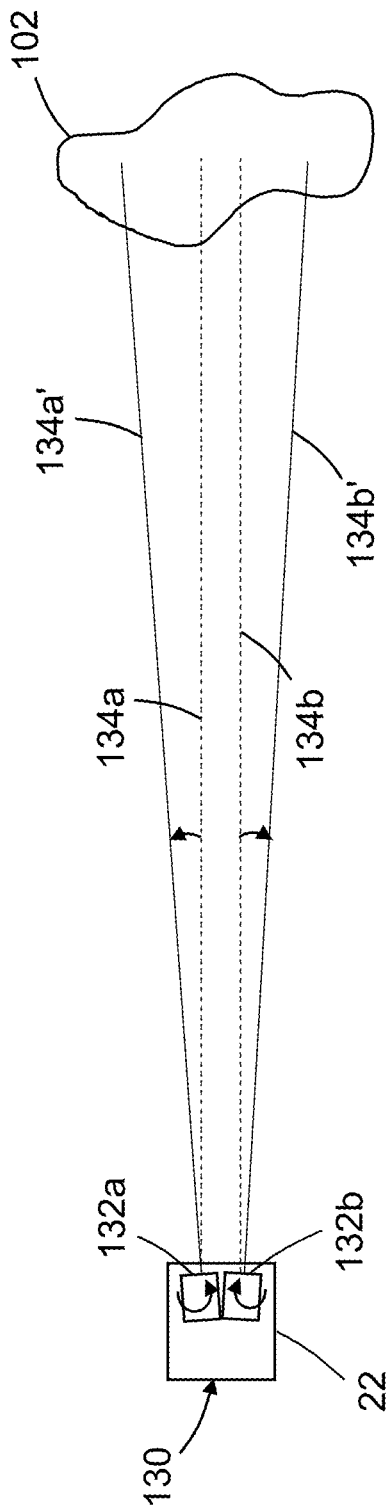
FIG. 6 is a diagram showing a top view of a video camera having a pair of pivotable laser pointers directed at a target object in accordance with another embodiment.

FIG. 6 is a diagram showing a top view of a video camera 130 having a pair of pivotable laser pointers 132a and 132b directed at a target object 102 in accordance with another embodiment, which video camera 130 can be incorporated in the cable-suspended platform 16 depicted in FIG. 1. Like the embodiment partly depicted in FIG. 3, the embodiment partly depicted in FIG. 6 is also capable of acquiring scale and point-to-point distance information for objects undergoing non-destructive inspection. When activated, the laser pointers 132a and 132b direct respective laser beams at respective laser spots on a surface of a target object 102. The laser pointers 132a and 132b may be independently pivotable or their pivoting mechanism may be coupled so that the laser pointers 132a and 132b are oppositely pivotable. As used herein, the phrase "oppositely pivotable" means that the angular positions of the laser pointers 132a and 132b relative to the focal axis (not shown in FIG. 6) of the video camera 130 pivot are equal and opposite at all times.

The laser pointers 132a and 132b can be rotated on-board the cable-suspended platform 16 by a known amount relative to the parallel configuration. This creates additional separation between the laser spots on the target object 102, which is useful for situations where the cable-suspended platform 16 is further from the target object 102 than may be the case for the embodiment depicted in FIG. 3. For example, initially the laser pointers 132a and 132b are positioned in parallel to emit respective laser beams along mutually parallel optical paths indicated by respective aim direction vectors 134a and 134b. Then the laser pointers 132a and 132b are rotated by a known angle and then activated again to emit respective laser beams along optical paths indicated by respective aim direction vectors 134a' and 134b'. The distance to the target object 102 can be determined using images captured by the on-board video camera (not shown), which images include the groups of pixels representing the laser spots. More specifically, this embodiment is configured to determine the distance d between the laser spots respectively produced on the target object 102 by the laser pointers 132a and 132b; and the distance D between the laser pointers 132a and 132b and the target object 102, as will be described in more detail below with reference to FIGS. 7A and 7B.

Figure 7A:
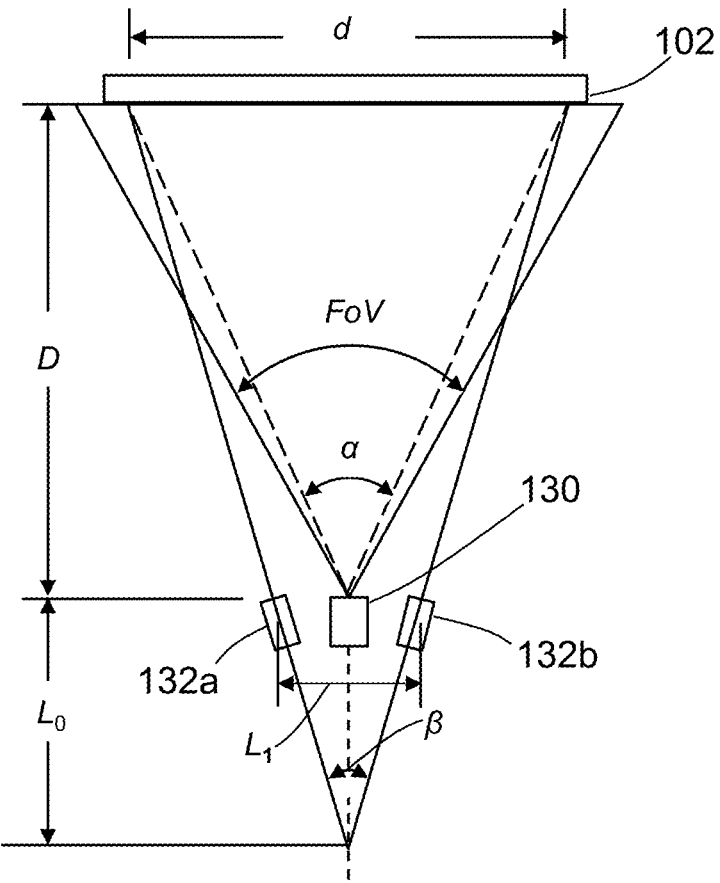
FIG. 7A is a diagram showing a video camera and a pair of pivotable laser pointers separated from a target object by a distance D, which laser pointers produce respective laser spots separated by a distance don the surface of the target object.
Figure 7B:
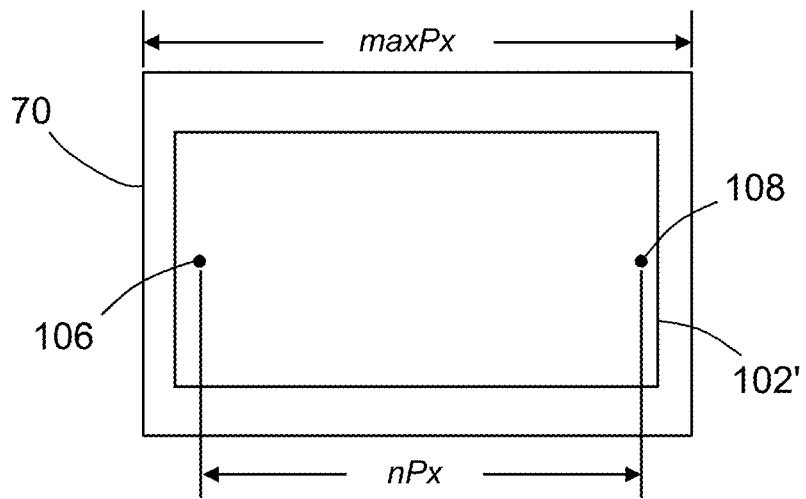
FIG. 7B is a diagram representing an image acquired by the video camera depicted in FIG. 7A, which image contains a representation of the target object.

FIG. 7A is a diagram showing a video camera 130 and a pair of pivotable laser pointers 132a and 132b separated from a target object 102 by the distance D, which laser pointers produce respective laser spots on the surface of the target object 102. These laser spots on the target object surface are separated by the distance d. FIG. 7B is a diagram representing an image 70 acquired by the video camera 130 depicted in FIG. 7A, which image 70 includes a representation 102' of the target object 102 and respective groups of pixels representing respective positions 106 and 108 of the laser spots.

In accordance with the situation depicted in FIGS. 7A and 7B, the known variables are the field-of-view of the video camera 130 (i.e., "FoV" in FIG. 7A), the maximum number of pixels in the width direction of the image 70 (i.e., "maxPx" in FIG. 7B), the number of pixels between the respective groups of pixels representing positions 106 and 108 of the laser spots produced by laser pointers 132a and 132b (i.e., "nPx," in FIG. 7B); the angle between the laser beams transmitted by the laser pointers 132a and 132b (i.e., "β" in FIG. 7A); and the distance separating the respective pivot axes of the laser pointers 132a and 132b (i.e., "L₁" in FIG. 7A). The unknown variables are the viewing angle α between the laser spots and the distances D and d.

The viewing angle α between the laser spots can again be computed using Eq. (1). Then the distances d and D can be computed using the following equations:

$$d = \frac{2 * L_1 * \sin(\alpha/2) * \cos(\beta/2)}{\sin\left(\frac{\alpha - \beta}{2}\right)}$$

$$D = \frac{d}{2 * \tan(\alpha/2)}$$

In accordance with one possible implementation, a scale factor can be calculated based on a ratio of the distance d and the number of pixels nPx and a scale bar or other scale indicator indicating the scale factor can be displayed on subsequent images captured by the video camera 130 while the cable-suspended platform 16 stays at the same location.

FIG. 8 is a diagram showing a top view of a video camera 130 having a pair of laser pointers 132*a* and 132*b* and a pivotable (about a single axis) third laser pointer 132*c* directed at a target object 102 in accordance with a further embodiment, which video camera 130 can be incorporated in the cable-suspended platform 16 depicted in FIG. 1. In accordance with this variation, the two laser pointers 132*a* and 132*b* are affixed to the video camera 130 and are mutually parallel and the third laser pointer 132*c* is rotatably mounted to the video camera 130 for rotation to a fixed or controllable angle relative to the other two laser pointers 132*a* and 132*b*. The third laser pointer 132*c* may emit laser light having a different color than the laser light emitted by laser pointers 132*a* and 132*b* to help differentiate the laser spots from each other on the target object 102. (In the alternative, this computational method can be made to use three laser pointers of the same color.) The laser pointers 132*a* and 132*b* emit respective laser beams along mutually parallel optical paths indicated by respective aim direction vectors 134*a* and 134*b*, while the third laser pointer 132*c* emits a laser beam along the optical path indicated by aim direction vector 134*a* in FIG. 8.

Figure 9A:
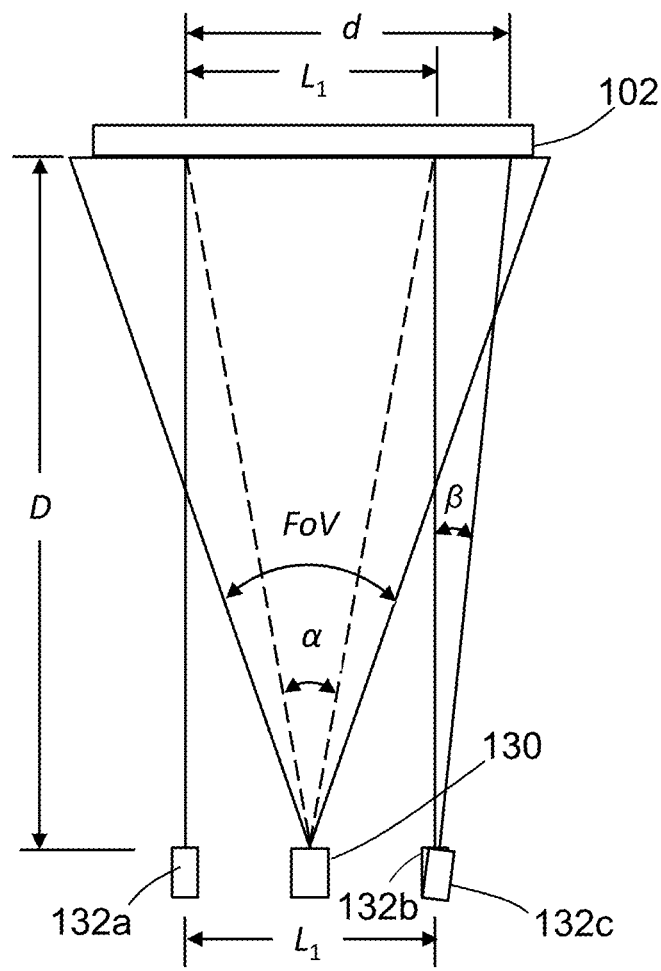
FIG. 9A is a diagram showing a video camera and three laser pointers configured as depicted in FIG. 8 and separated from a target object by a distance D, which laser pointers produce respective laser spots, the furthest apart of which are separated by a distance d on the surface of the target object.
Figure 9B:
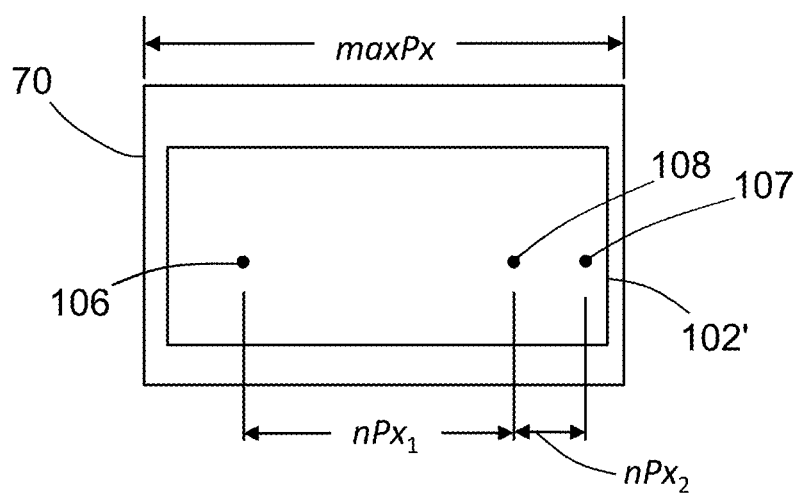
FIG. 9B is a diagram representing an image acquired by the video camera depicted in FIG. 9A, which image contains a representation of the target object.

FIG. 9A is a diagram showing a video camera 130 and three laser pointers 132*a-c* configured as depicted in FIG. 8 and separated from a target object 102 by the distance D, which laser pointers 132*a-c* produce respective laser spots, the furthest apart of which are separated by a distance d on the surface of the target object 102. The laser spots produced on the target object surface by mutually laser pointers 132*a* and 132*b* are separated by the distance $L_1$, which is also the physical distance separating the axes of laser pointers 132*a* and 132*b*. The laser spots produced on the target object surface by laser pointers 132*a* and 132*b* are separated by the distance d. FIG. 9B is a diagram representing an image 70 acquired by the video camera 130 depicted in FIG. 9A, which image 70 includes a representation 102' of the target object 102 and respective groups of pixels representing respective positions 106, 107 and 108 of the laser spots.

In accordance with the situation depicted in FIGS. 9A and 9B, the known variables are the field-of-view of the video camera 130 (i.e., "FoV" in FIG. 9A), the maximum number of pixels in the width direction of the image 70 (i.e., "maxPx" in FIG. 9B), the number of pixels between the respective groups of pixels representing respective positions 106 and 108 of the laser spots produced by laser pointers 132*a* and 132*b* (i.e., "$nPx_1$" in FIG. 9B); the number of pixels between the respective groups of pixels representing respective positions 108 and 107 of the laser spots produced by laser pointers 132*b* and 132*c* (i.e., "$nPx_2$," in FIG. 9B); the angle between the laser beams transmitted by the laser pointers 132*b* and 132*c* (i.e., "β" in FIG. 9A); and the distance separating the respective axes of the laser pointers 132*a* and 132*b* (i.e., "$L_1$" in FIG. 9A). The unknown variables are the viewing angle α between the laser spots and the distances D and d.

The viewing angle α between the laser spots produced by laser pointers 132*a* and 132*b* can again be computed using Eq. (1). Then the distances d and D can be computed using the following equations:

$$D = \frac{L_1/2}{\frac{nPx_1}{maxPx} * \tan\left(\frac{FoV}{2}\right)}$$

$$d = L_1 + D * \tan\beta$$

or $$d = L_1 + (nPx_1 + nPx_2)/nPx_1$$

Thus there are two ways to calculate d: one uses the angle β and the other uses $nPx_2$. Having two separate ways of calculating the value for distance d serves as a process check to improve reliability.

In accordance with one possible implementation, a scale factor can be calculated based on a ratio of the distance d and the sum ($nPx_1+nPx_2$). Thereafter a scale bar or other scale indicator indicating the scale factor can be displayed on subsequent images captured by the video camera 130 while the cable-suspended platform 16 stays at the same location.

In accordance with the embodiments partly depicted in FIGS. 5A, 5B, 7A, 7B, 9A and 9B, an image processing method is used to determine the distance in pixels between the images of the laser spots displayed on the image 70. The main goal of the image processing step is to determine the distance in pixels between laser spots on the target object. There are several methods that could be used for this, such as those using pixel color, but that approach is not very robust in environments that might have a wide variety of lighting conditions. For this application, a process involving sequential images with the laser spots on in one image and off in the next is used. The method involves cycling the laser pointers on and off at a rate that is half the rate (or other integer divisor) of the video camera frame rate, and then performing an image subtraction step to identify contiguous clusters pixels that have changed. The difference between the centroids of the contiguous clusters will be the pixel distance (nPixels), which pixel distance can be used in conjunction with the distance d to calculate a scale factor and later display a scale indicator that graphically depicts that scale factor.

Change detection is a process used to determine the difference between two or more images. For example, regions of change can be determined using digital image processing techniques. One such process may involve image subtraction, blur filters, and image segmentation steps. The term "digital image processing" means a computer-based analysis of an image or series of images. The term "pixels" refers to picture elements that make up a 2-D digital image. Segmentation is the process of identifying pixels that have similar properties in a digital image.

Figure 10:
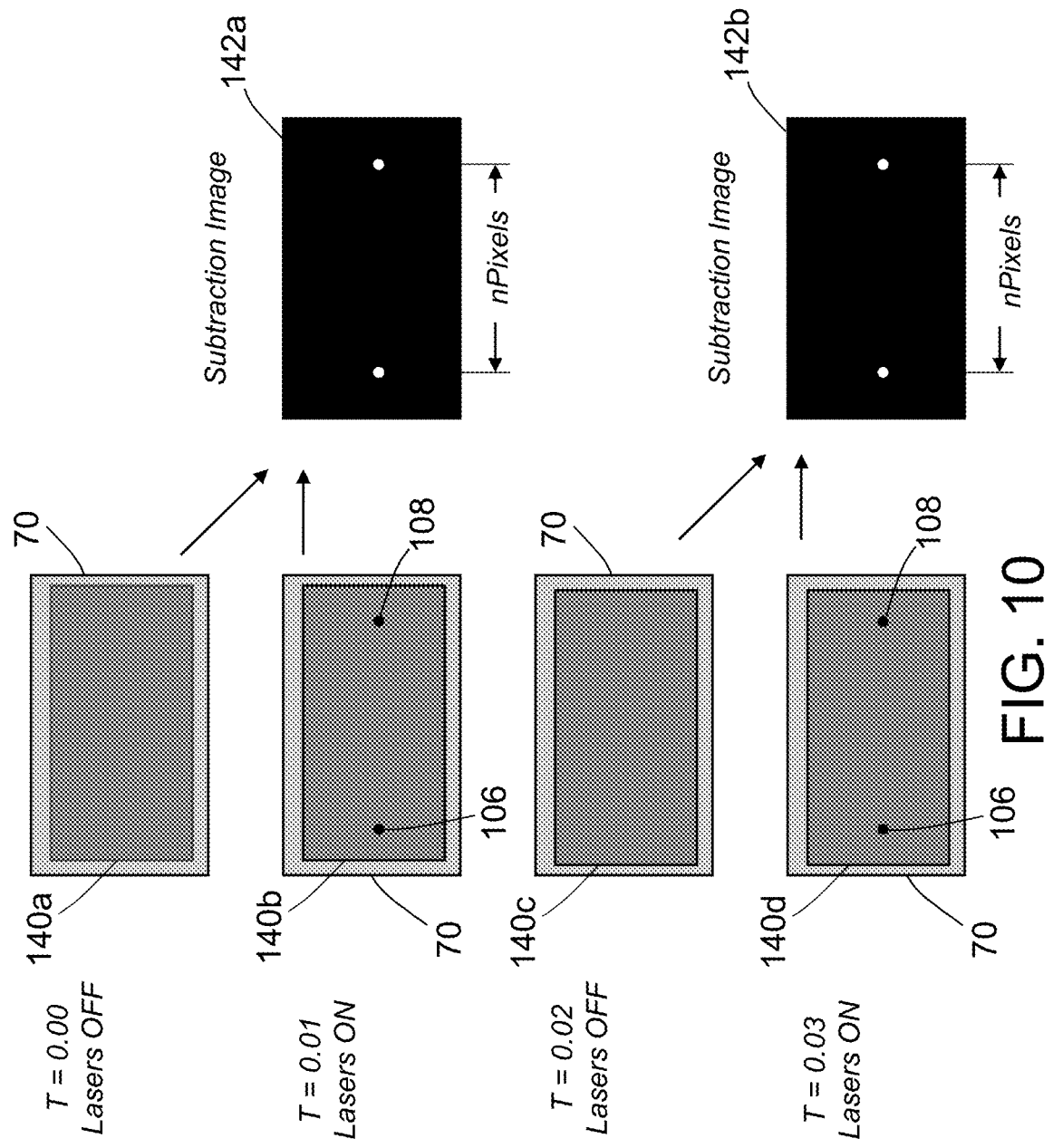
FIG. 10 is a diagram illustrating steps of a method for processing images to determine the distance in pixels between laser spots on a target object in accordance with one embodiment.

FIG. 10 is a diagram illustrating steps of a method for processing images to determine the distance in pixels between laser spots on a target object in accordance with one example. The video camera 130 captures respective frames 140*a-d* at times T=0.00, 0.01, 0.02 and 0.03. The laser pointers 132*a* and 132*b* are OFF when the frames 140*a* and 140*c* are captured at times T=0.00 and 0.02, but ON when the frames 140*b* and 140*d* are captured at times T=0.01 and 0.03. Frame 140*b* is subtracted from frame 140*a* to produce a subtraction image 142*a*; frame 140*d* is subtracted from frame 140*c* to produce a subtraction image 142*b*. The locations of differences in the subtraction images 142*a* and 142*b* are then determined. The centroid of each area is found and converted into pixel coordinates (x, y). A distortion correction is performed to compensate for the optics of the camera, where two-dimensional image corrections are applied resulting in (x', y'). This correction may depend on, for example, the lens optics, zoom, and focus levels. The corrections are determined experimentally in one embodiment, and recalled at run-time using a table lookup. After lighting correction is applied, the differences (i.e., the images of the laser spots) which appear in each subtraction image are determined. In one embodiment, a pixel-by-pixel difference operation is performed, followed by a blur filter operation, and then an image segmentation operation. An N×N blur filter (such as a 5×5 kernel) can be used to smooth out most of the high-frequency noise associated with the images, and can be adjusted to discard areas of various sizes. The blurred image is then segmented into distinct, non-touching areas. The centroid of each of the separate regions is computed and is stored in a list associated with each of the image pairs. The number of pixels separating the two centroids corresponding to the two laser spots is then calculated.

Figure 11:
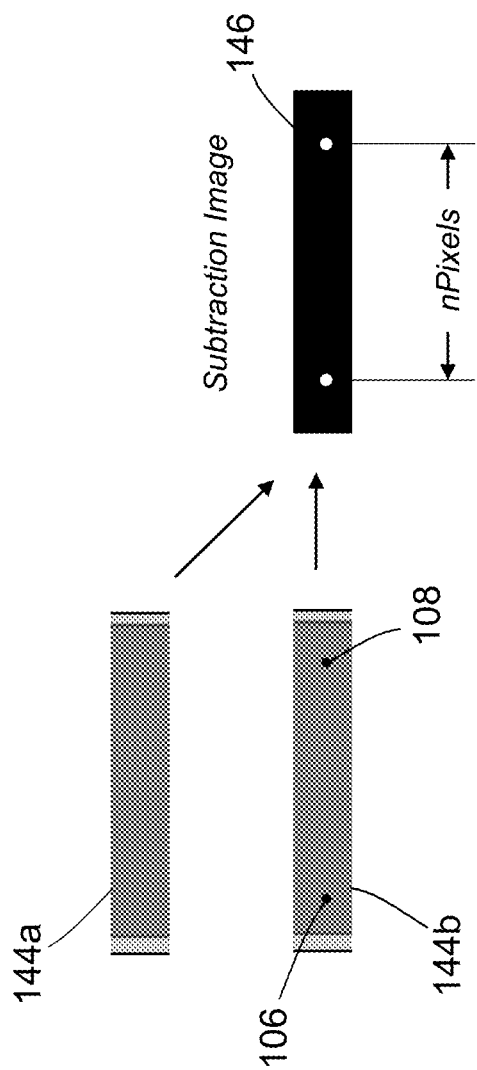
FIG. 11 is a diagram illustrating steps of a method for processing images to determine the distance in pixels between laser spots on a target object in a manner that improves the image processing efficiency.

Since the groups of pixels representing the respective positions 106 and 108 of the laser spots will be in the same horizontal strip of each image, only that part of the image is needed for the image processing. FIG. 11 is a diagram illustrating steps of a method for processing images to determine the distance in pixels between laser spots on a target object in a manner which improves the image processing efficiency. Horizontal strips 144a and 144b, for example, can be created from by frames 140a and 140b respectively. Horizontal strip 144b is then subtracted from horizontal strip 144a to form a subtraction image 146.

Another category of embodiments of the concept are configurations where the cable-suspended platform 16 incorporates two or more laser range meters that enable: measurement of distance to the target, reference scale, as well as one or more orientation angle of the cable-suspended platform 16 relative to the target. If three non-collinearly mounted laser range meters are used (not shown here), more than one orientation angle can be measured (for example, yaw and pitch).

Figure 12:
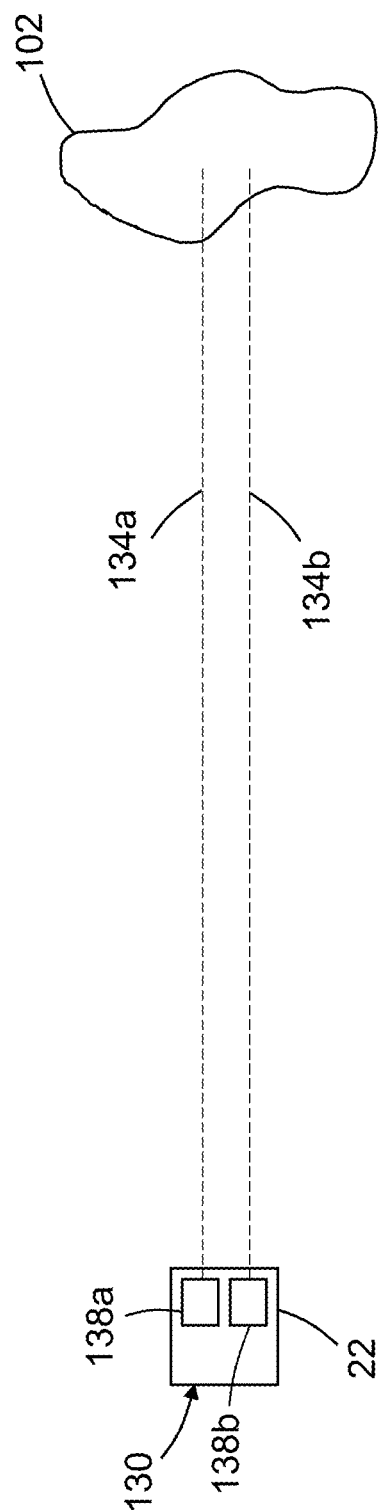
FIG. 12 is a diagram showing a top view of a video camera having a pair of laser range meters directed at a target object in accordance with another embodiment.

FIG. 12 is a diagram showing a top view of a video camera 130 having a pair of laser range meters 138a and 138b directed at a target object 102 in accordance with another embodiment, which video camera 130 can be incorporated in the cable-suspended platform 16 depicted in FIG. 1. The laser range meters 138a and 138b are affixed to and rotate with the video camera 130. The embodiment partly depicted in FIG. 12 is capable of acquiring scale information for objects undergoing non-destructive inspection. It is also capable of measuring the separation distance D between the cable-suspended platform 16 and the target object 102 and the orientation angle of the cable-suspended platform 16 relative to target object 102. The laser range meters 138a and 138b are arranged in a mutually parallel configuration. For example, the pair of laser range meters 138a and 138b having mutually parallel axes are fixedly mounted to the housing 22 of the video camera 130. Preferably the focal axis of the video camera 130 and the aim directions of the laser range meters 138a and 138b are mutually parallel. When activated, the laser range meters 138a and 138b direct respective mutually parallel laser beams that form respective laser spots on a surface of the target object 102.

In instances wherein the axes of the laser range meters 138a and 138b are not perpendicular to the portion of the surface of target object 102 where the laser beams impinge, the respective distances separating the laser range meters 138a and 138b from that surface will not be equal and the cable-suspended platform 16 will have a non-zero orientation angle relative to that surface. In instances wherein the axes of the laser range meters 138a and 138b are perpendicular to the portion of the surface of target object 102 where the laser beams impinge, the respective distances separating the laser range meters 138a and 138b from that surface will be equal and the orientation angle will be zero. Thus measurements of the respective separation distances of the laser range meters 138a and 138b from the target object 102 can be used to determine the current offset of the cable-suspended platform 16 from the target object 102 and the current orientation angle and then control the cable-suspended platform 16 to move in a manner that reduces both the deviation of the current offset from a goal offset and the deviation of the current orientation angle from a target orientation angle (e.g., an angle of zero degrees).

The video camera 130 may be activated to capture an image in which the two laser spots formed by the laser beams emitted by laser range meters 138a and 138b are visible. This image data can be processed (as described in some detail below) to derive pixel information which, in conjunction with the known distance separating the axes of the two laser range meters 138a and 138b, can be used to determine a scale factor. That scale factor can then be used to display a scale indicator on any subsequent image captured by the video camera 130 while the cable-suspended platform 16 is at the same location.

For the multiple-laser-range-meter embodiments, since the information associated with the distances to the target object 102 from the respective laser range meters has been measured, and since the field-of-view of the video camera 130 is known, it is possible to determine the scale factor without the need for the image processing step. The part that can be used from the image processing step is nPx, but that can be computed as a function of FoV, average distance D/n, $L_1$, and maxPx (where n is the number of laser range meters) using the following equation:

$$nPx = \frac{L_1 * \text{max}Px * n}{\sum_{i=0}^{N} D_i * \tan(FoV/2)}$$

(Note: The foregoing computation also needs an image distortion correction step, or more accurately the inverse of it.)

In response to commands from the control station 150 (see FIG. 4), the video camera 130 and the laser range meters 138a and 138b can be activated by control signals (e.g., via electrical cables) output by the on-board computer system 162. The computer system 162 also controls the movements of the pan unit 126 and tilt unit 128 by sending commands to the pan motor 122 and tilt motor 124 (see FIG. 4).

In accordance with alternative embodiments, the cable-suspended platform 16 comprises more than one laser range meter to enable measurement of distance to the target object, as well as one or more orientation angle. If two laser range meters are used (as in the embodiment shown in FIG. 12), one orientation angle can be measured (e.g., yaw). If three non-collinearly mounted laser range meters are used (not shown in the drawings), more than one orientation angle can be measured (e.g., yaw and pitch). From this information, a scale factor can be displayed to the user, or a motion constraint can be applied for vehicle control.

Figure 13:
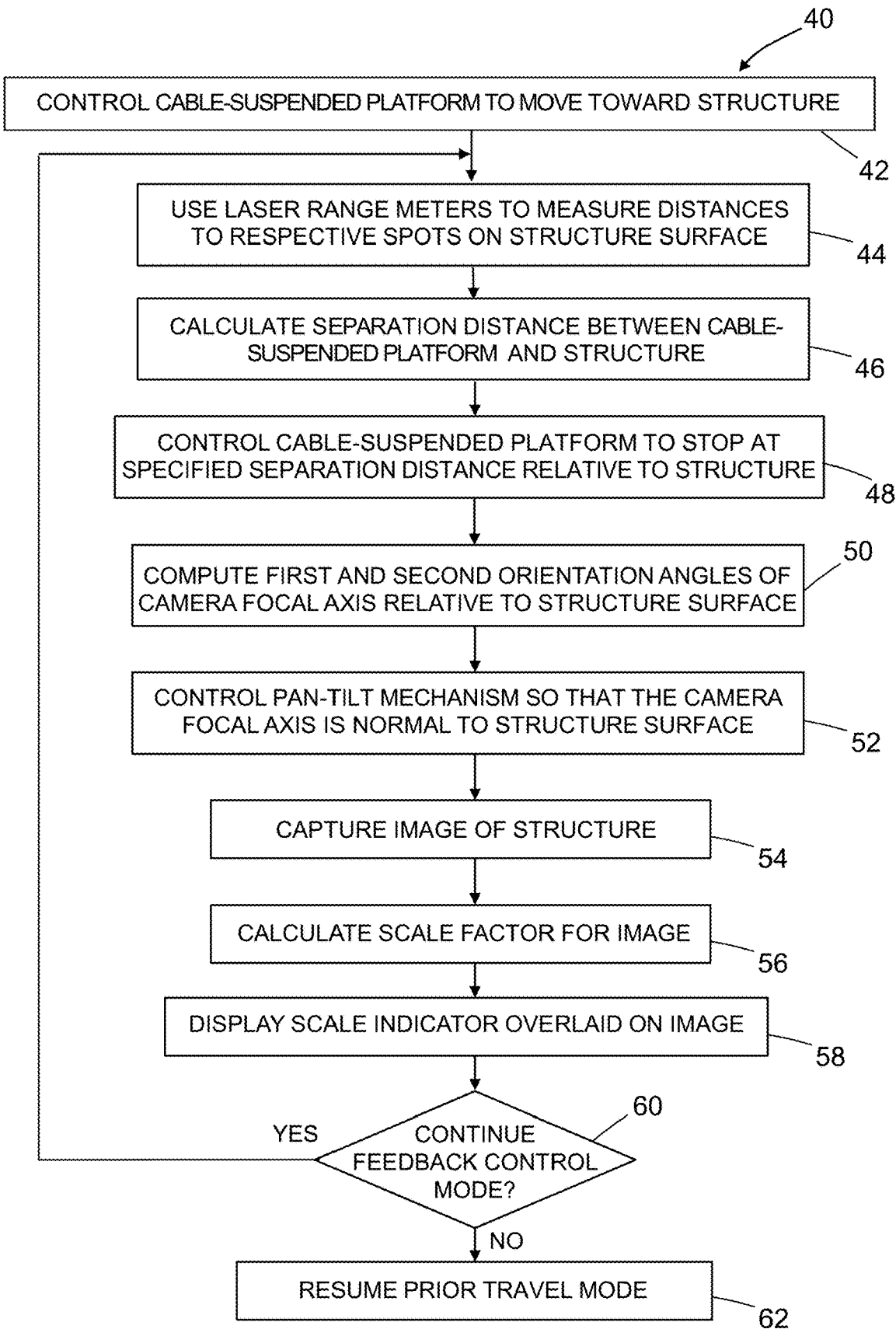
FIG. 13 is a flowchart identifying steps of a method for operating a cable-suspended platform during non-destructive inspection of a target object in accordance with one embodiment.

FIG. 13 is a flowchart identifying steps of a method 40 for operating a cable-suspended platform during non-destructive inspection of a structure in accordance with one embodiment in which three non-collinearly mounted laser range meters 38 are used and yaw and pitch orientation angles are measured. Method 40 comprises the following steps: (a) controlling a cable-suspended platform to move toward a structure to be inspected (step 42); (b) using the three laser range meters 38 on-board the cable-suspended platform to repeatedly measure (i.e., calculate) respective distances separating the laser range meters from respective spots on a surface of the structure while the cable-suspended platform is moving (step 44); (c) calculating a first separation distance separating the cable-suspended platform from the structure based at least on the distances calculated in step 44 (step 46); (d) controlling the cable-suspended platform to stop at a specified separation distance (e.g., equal to a goal offset) relative to the structure (step 48); (e) computing yaw and pitch orientation angles of a focal axis of the video camera 130 relative to a plane intersecting the three laser spots on the surface of the structure based on the distances calculated in step 44 (step 50); (f) controlling the pan-tilt mechanism 120 to reorient the video camera 130 so that the focal axis of the video camera 130 is normal to the surface of the structure (step 52); (g) using the video camera 130 to capture an image of the structure while the cable-suspended platform is at the specified separation distance (e.g., at a first location) (step 54); (h) calculating a scale factor for the image when displayed on a display screen based at least in part on the separation distance and a field of view of the video camera 130 (step 56); (i) displaying the image with a scale indicator overlaid thereon, a value or a length of the scale indicator representing the scale factor (step 58); and (j) determining with to continue the feedback control mode or not (step 60). If a determination is made in step 60 that the feedback control mode should be continued, the process returns to step 44. If a determination is made in step 60 that the feedback control mode should not continue, the prior cable-suspended platform movement mode is resumed (step 62).

In accordance with the configuration depicted in FIG. 1, the data acquired by the equipment (i.e., the measurement data acquired by laser range meters 138a and 138b and the image data acquired by video camera 130) on-board cable-suspended platform 16 is transmitted by a transceiver 160. That message is received by a control station 150 on the ground. The computer system at the control station 150 extracts the image data representing the image from the message and causes it to be displayed on the screen of display monitor 152 by controlling the states of the pixels of the display screen in accordance with the image data.

In accordance with one aspect of the motion control function, the cable-suspended platform 16 can be controlled to translate to a second location while maintaining the separation distance. Then the video camera 130 is activated to capture a second image of the structure while the cable-suspended platform 16 is at the second location, which second image can be displayed on the display screen. The two images may be stitched together for display. In some instances, the first and second images may respectively comprise first and second sets of image data representing partially overlapping or contiguous areas on a surface of the structure.

In accordance with another aspect of the motion control function, the computer system at the control station 150 may be programmed to detect a deviation of the separation distance from the goal offset after the cable-suspended platform 16 has moved from the first location to a second location, and then control the cable-suspended platform 16 to move to a third location at which the separation distance equals the goal offset, thereby reducing the deviation to zero. The computer system at the control station 150 may be further programmed to execute the following operations: computing an orientation angle of the focal axis of the video camera 130 relative to the surface of the structure based on the first, second and third distances measured by three laser range meters 138 while the cable-suspended platform 16 is at the second location; detecting a deviation from the desired orientation angle while the cable-suspended platform 16 is at the second location; and controlling the pan-tilt mechanism 120 to change the orientation of the video camera 130 so that the orientation angle equals the desired orientation angle while the cable-suspended platform 16 is at the second location.

Figure 14:
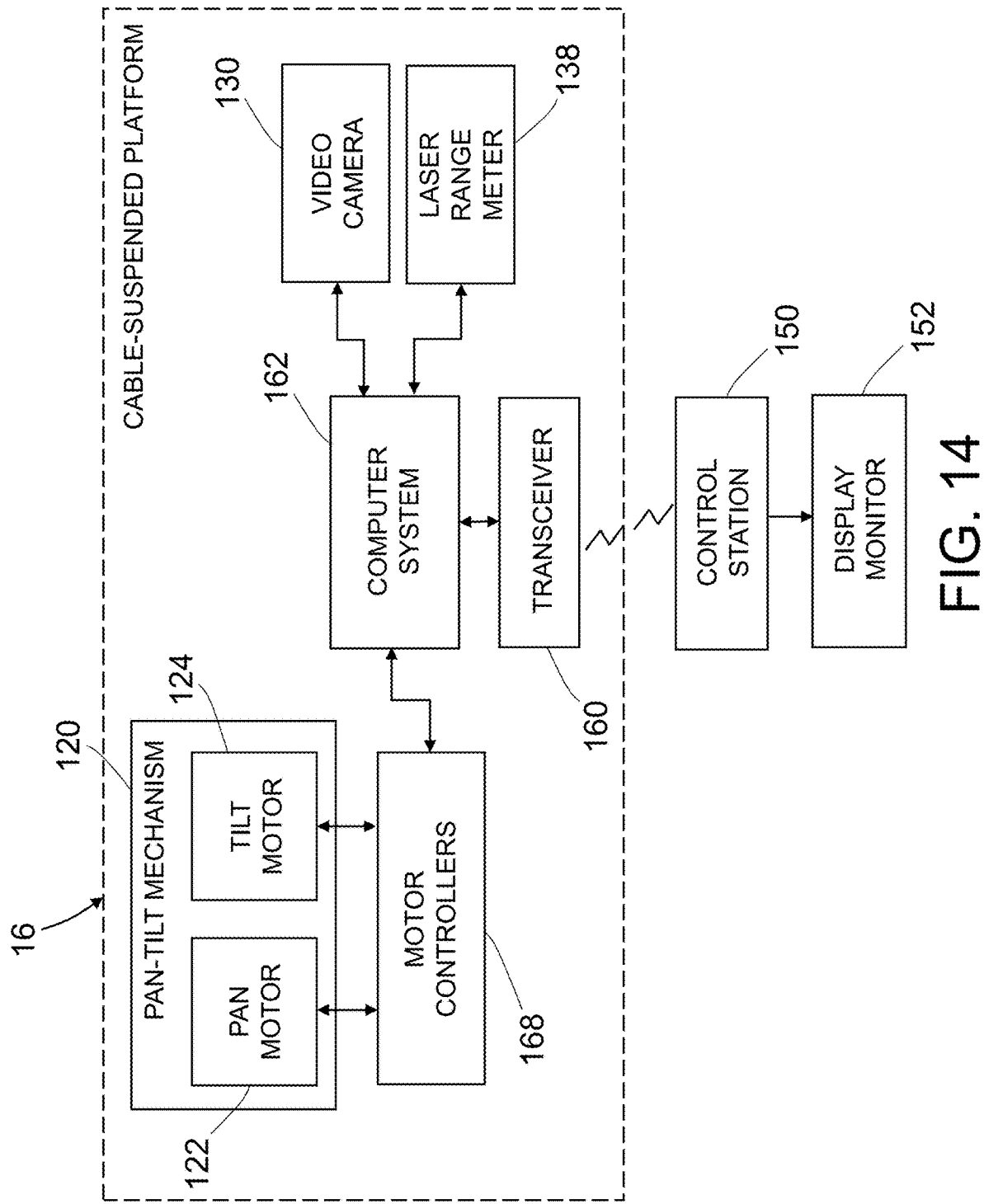
FIG. 14 is a block diagram identifying some components of a system for performing non-destructive inspection of a structure using a remote-controlled cable-suspended platform having an on-board local positioning system.

FIG. 14 is a block diagram identifying some components of a system for performing non-destructive inspection of a structure using a remote-controlled cable-suspended platform 16 in accordance with an alternative embodiment. The only difference between the systems respectively depicted in FIGS. 4 and 14 is that the system shown in FIG. 4 has laser pointers 132 mounted to the housing 22 of the video camera 130, whereas the system shown in FIG. 14 has a laser range meter 138 mounted to the housing 22 of the video camera 130.

As seen in FIG. 14, the equipment on-board the cable-suspended platform 16 comprises a pan-tilt mechanism 120, a video camera 130 and a laser range meter 138, all of which can be activated by control signals (e.g., via electrical cables) transmitted by the computer system 162. The computer system 162 can also adjust the orientation of the video camera 130 by sending commands to the motor controllers 168 which respectively control pan motor 122 and tilt motor 124. The pan-tilt mechanism 120 is controlled to rotationally adjust the laser range meter 138 and the video camera 130 to selected angles around the pan and tilt axes. The aim direction vector 134, which describes the orientation of the laser range meter 138 (and the focal axis of the video camera 130) relative to the fixed coordinate system of the cable-suspended platform 16, is determined from the pan and tilt angles when the laser range meter 138 is aimed at a point of interest on the target object 102.

The laser range meter 138 may be incorporated inside the housing 22 of video camera 130 or mounted to the outside of housing 22 in such a way that it transmits a laser beam along the aim direction vector 134. The laser range meter 138 is configured to measure the distance to any visible feature on or any marker attached to the target object 102. In accordance with some embodiments, the laser range meter 138 uses a laser beam to determine the distance to the target object 102. The most common form of laser range meter operates on the time-of-flight principle by sending a laser pulse in a narrow beam towards the target object 102 and measuring the time taken by the pulse to be reflected off the target object 102 and returned to a photodetector incorporated inside the laser range meter 138. With the speed of light known and an accurate measurement of the time made, the distance from the laser range meter 138 to the spot on the surface of the target object 102 where the laser beam impinges can be calculated. Many pulses are fired sequentially while the cable-suspended platform 16 is at a location and the average response is most commonly used.

Figure 15:
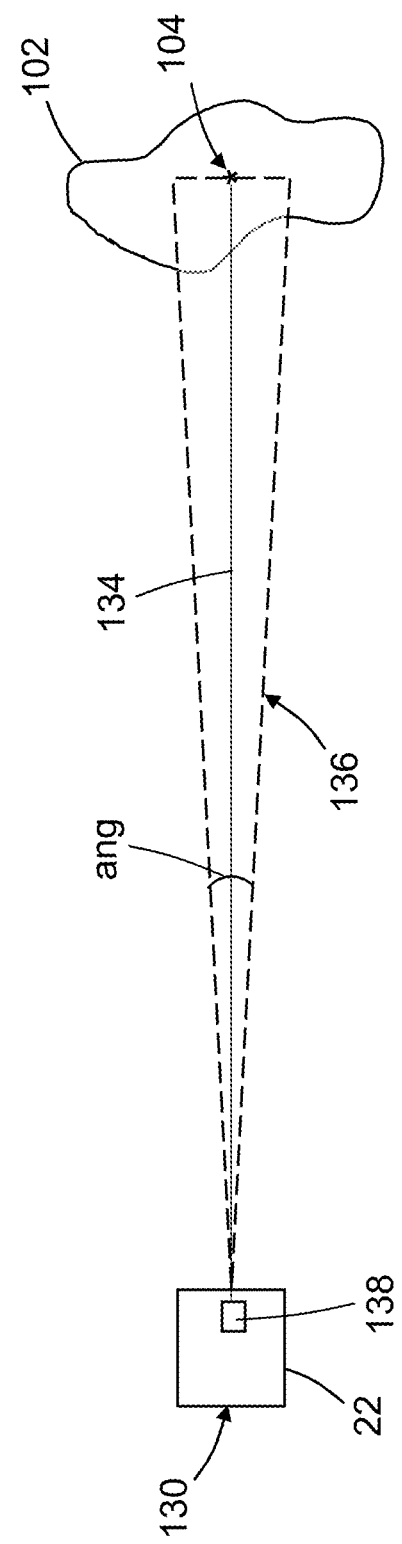
FIG. 15 is a diagram showing a top view of a video camera having a laser range meter directed at a target object.

FIG. 15 is a diagram showing a top view of a video camera 130 having a laser range meter 138 directed at a target object 102, which video camera 130 can be incorporated in the cable-suspended platform 16 depicted in FIG. 1. The laser beam transmitted by the laser range meter 138 impinges on a surface of the target 102 at a laser spot 104.

The angle of the field-of-view 136 (indicated by a pair of dashed lines) of the video camera 130 is indicated by the arc labeled "ang" in FIG. 15. The aim direction vector 134 extends from the laser range meter 138 to the laser spot 104 and has a length D (also referred to below as the "distance D" separating the laser range meter 138 and the target object 102).

In accordance with one embodiment, the distance D is measured by the laser range meter 138 while the angle of the field-of-view 136 is known. This information can be used to overlay or superimpose a size scale indicator on the screen of display monitor 152 (see FIG. 14) when an image captured by the video camera 130 is being displayed. If the distance D to the target object 102 is known, scale information displayed in the image on the screen of display monitor 152 allows a user to gage the size of objects in the displayed image. The scale indicator could be in the form of the overall horizontal and vertical dimensions of the image on the display or an on-screen overlay showing scale factor data on a portion of the screen. This provides the size context for the scene captured by the video camera 130 and displayed in the image on the screen of display monitor 152.

The known camera field-of-view angle is given by the following equation:

$$ang = 2*a\,\tan(SCRx/(2D))$$

The image X and Y values are given by the following equations:

$$SCRx = D*\tan(ang/2)$$

$$SCRy = ratio*SCRx$$

where D is the distance to the target object surface measured by the laser range meter 138, and "ratio" is the image aspect ratio (known), i.e., the ratio of the image width w to image height h.

In accordance with further embodiments, the fully motorized pan-tilt mechanism 120 can be used for aiming the laser range meter 138 independently of the cable-suspended platform movement controls to acquire a direct measurement of the distance separating two points on the surface of the target object 102. Assuming that the translational offset is zero or can be measured, then all of the basic features of the local positioning system 38 can be used.

Figure 16:
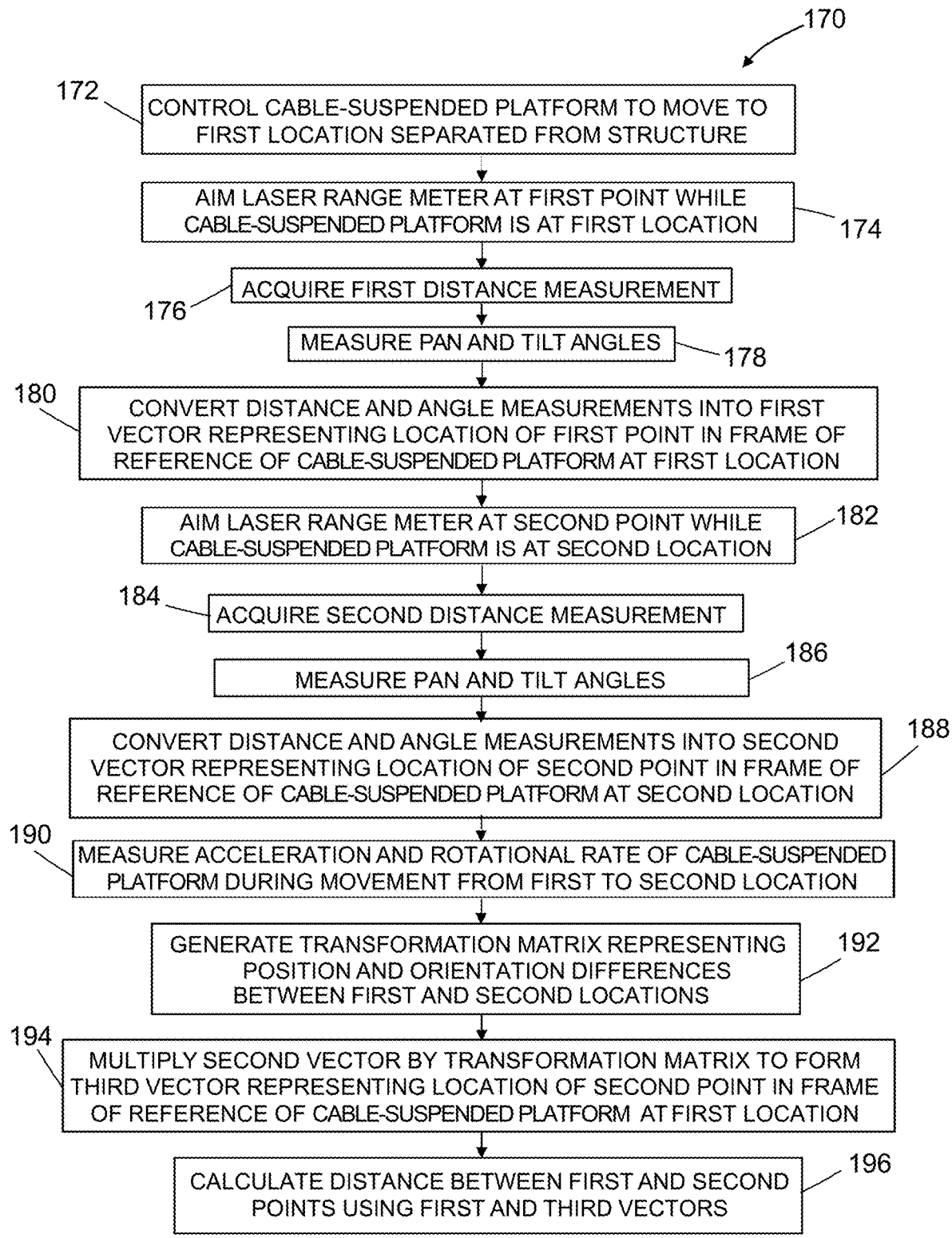
FIG. 16 is a flowchart identifying steps of a method for sizing a feature of a structure using a cable-suspended platform carrying a local positioning system.

FIG. 16 is a flowchart identifying steps of a method 170 for sizing (i.e., measuring a point-to-point distance of) a feature on the surface of a structure to be inspected using a cable-suspended platform 16 carrying a local positioning system 38. The method 170 comprises the following steps: (a) controlling the cable-suspended platform 16 to move toward and then stay at a first location which is separated from a structure to be inspected (step 172); (b) aiming the laser range meter 138 at a first point corresponding to a first visible feature on a surface of the structure while the cable-suspended platform is at the first location (step 174) and acquiring a first distance measurement (step 176); (c) using the pan-tilt mechanism 120 to measure the respective pan and tilt angles of the laser range meter 138 when the latter is aimed at the first point (step 178); (d) converting the distance and angle measurements acquired in steps 176 and 178 into a first vector representing the location of the first point in the frame of reference of the cable-suspended platform 16 at the first location (step 180); (e) aiming the laser range meter 138 at a second point corresponding to a second visible feature on the surface of the structure while the cable-suspended platform 16 is at a second location (step 182) and acquiring a second distance measurement (step 184); (f) using the pan-tilt mechanism 120 to measure the respective pan and tilt angles of the laser range meter 138 when the latter is aimed at the second point (step 186); (g) converting the distance and angle measurements acquired in steps 184 and 186 into a second vector representing the location of the second point in the frame of reference of the cable-suspended platform 16 at the second location (step 188); (h) using an IMU 166 to measure acceleration and rotational rate of the cable-suspended platform during movement from the first location to the second location (step 190); (i) generating a transformation matrix representing a position difference and an orientation difference between the first and second locations of the cable-suspended platform 16 based on information acquired in step 190 (step 192); (j) multiplying the second vector by the transformation matrix to form a third vector representing the location of the second point in the frame of reference of the cable-suspended platform 16 at the first location (step 194); and (k) calculating a distance between the first and second points using the first and third vectors (step 196).

In accordance with one embodiment, the method described in the preceding paragraph further comprises: (l) transmitting one or more messages containing measurement data acquired in steps 176, 178, 184, 186 and 190 from the cable-suspended platform 16; (m) receiving the one or more messages at a control station 150 (see FIG. 14); and (n) extracting the measurement data from the message, wherein steps 180, 188, 192, 194 and 196 are performed by a computer system at the control station 150. This method may further comprise: using the video camera 130 to capture an image of a portion of the surface of the structure that includes the first and second visible features while the cable-suspended platform 16 is at the first location; and displaying the image and symbology representing a value of the distance calculated in step 196 overlaid on the image on a display monitor 152 at the control station 150. For example, the first and second visible features may be respective endpoints of an anomaly (such as a crack) in the structure.

Figure 17:
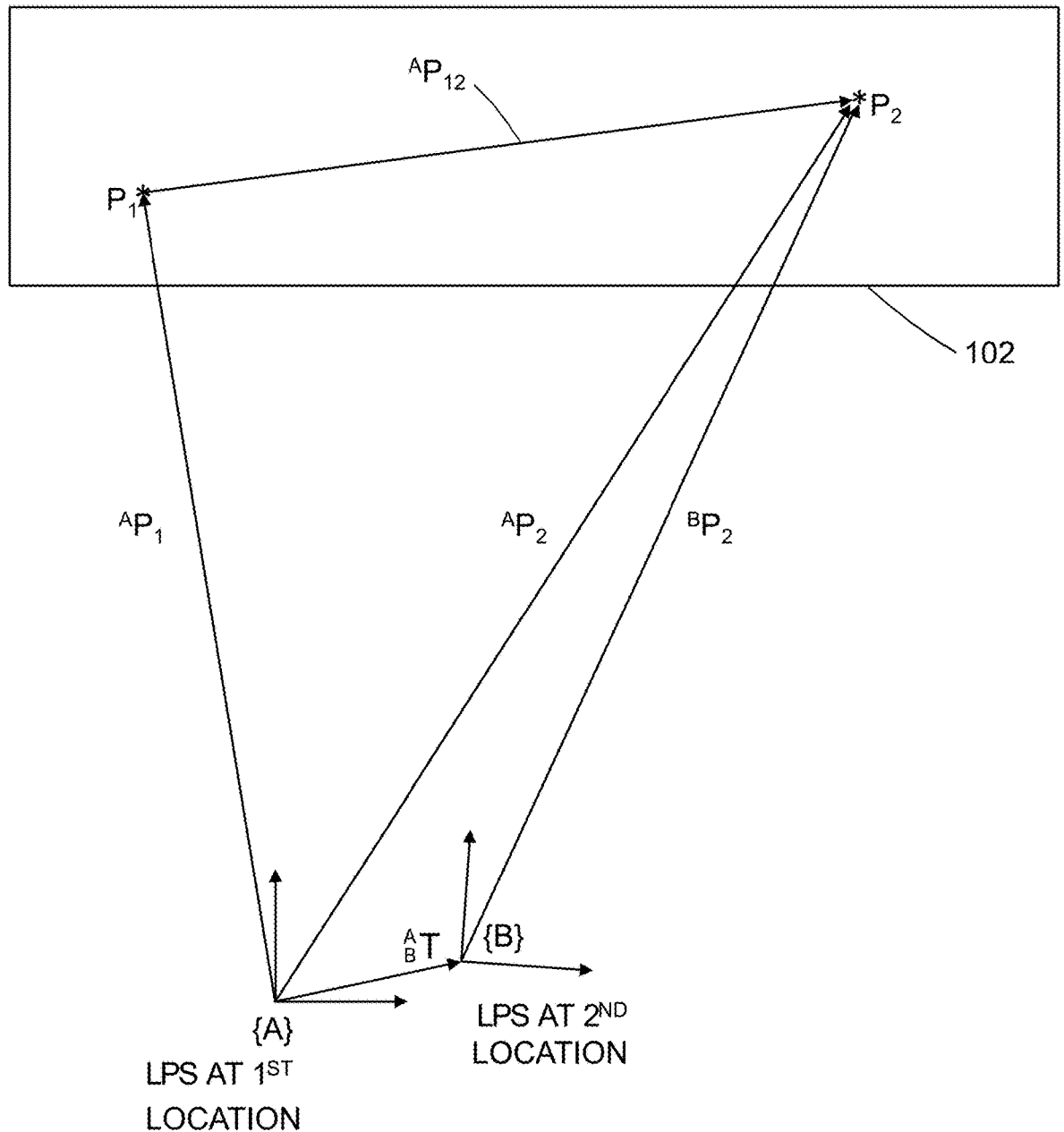
FIG. 17 is a vector diagram illustrating a method for generating a vector representing the distance and direction from a first point on a target object to a second point on the target object using a cable-suspended platform that incorporates the video camera and laser range meters depicted in FIG. 15.

FIG. 17 is a vector diagram illustrating the above-described method for generating a vector representing the distance and direction from a first point on a target object 102 to a second point on the target object 102 using the above-described cable-suspended platform 16. Because a single laser range meter 138 is used to directly measure coordinates for two points, a common reference location is used to determine the distance between the two points. In this situation, the user determines the difference between the first location of the cable-suspended platform 16 during acquisition of the coordinates of the first point in a first frame of reference of the local positioning system 38 (and of the cable-suspended platform 16) and the second location of the cable-suspended platform 16 during acquisition of the coordinates of the second point in a second frame of reference of the local positioning system which is offset from the first frame of reference. Using the acquired coordinate position data, a transformation matrix representing a position difference and an orientation difference between the first and second frames of reference of the local positioning system 38 (i.e., the differences between the first and second locations of the cable-suspended platform 16 at the instants in time when the first and second measurements were made) is generated.

The vector diagram seen in FIG. 17 shows the configuration described in the preceding paragraph. Two pairs of mutually orthogonal arrows that meet at respective vertices graphically depict respective frames of reference (a respective third mutually orthogonal axis for each frame of reference is not shown to avoid clutter in the drawing). The left-hand pair of arrows represents a frame of reference A of the cable-suspended platform 16 at the first location, while the right-hand pair of arrows represents a frame of reference B of the cable-suspended platform 16 at the second location. The location offset of frame of reference B relative to frame of reference A is represented in FIG. 17 by the transformation matrix $_B^A T$, which is a 4×4 homogeneous transformation matrix that describes reference frame {B} relative to reference frame {A}. In this situation the position and orientation of reference frame {B} relative to reference frame {A} may be determined from data acquired using the previously described cable length position measurement process.

The distance from the laser range meter 138 to a first point P1 on a surface of a target object 102 when the cable-suspended platform 16 is at the first location is represented by the length of a vector $^A P_1$ extending from the origin of frame of reference {A}. The distance from the laser range meter 138 to a second point P2 on the surface of target object 102 when the cable-suspended platform 16 is at the second location is represented by the length of a vector $^B P_2$ extending from the origin of frame of reference {B} to second point P2. The vector $^B P_2$ is then multiplied by the transformation matrix $_B^A T$ to convert it into a vector defined in reference frame A. The resulting product is:

$$^B P_2 = {}^A P_2$$

The magnitude (i.e., length) of vector $^A P_2$ represents the distance from the laser range meter 138 to the second point P2 when the cable-suspended platform 16 was at the first location. The distance d is determined from the difference between those two vectors, which operation can be expressed as follows:

$$d = |{}^A P_2 - {}^A P_1|$$

In an equivalent manner, the distance d between points $P_1$ and $P_2$ is the magnitude (i.e., the Euclidean norm) of the three-dimensional vector connecting the two points. It is computed as the square root of the sum of the squares of the differences of the individual components of the measured point coordinates (i.e., x, y and z values). The general form of this equation is:

$$d = \sqrt{(x_2 - x_1)^2 + (y_2 - y_1)^2 + (z_2 - z_1)^2}$$

The resulting distance value is displayed (e.g., superimposed or virtually overlaid) on the screen of the display monitor 152 along with the camera image of the portion of the surface of the target object 102 that includes points P1 and P2. Optionally, a line can be drawn between the two points to show context.

The movement of the cable-suspended platform 16 during a non-destructive inspection operation may be subjected to various motion constraints which are designed to make the cable-suspended platform 16 easier for a user to control for specific types of tasks. The term "motion constraints" should be given the ordinary kinematic definition. In general, motion constraints remove one or more degrees of freedom (DoF) from the motion of an object. For example, a single rigid body object in free space has six degrees of freedom (i.e., x, y, z, roll, pitch and yaw), but when that rigid body object is constrained, for example, by placing it on a table (in a location with gravity), the number of degrees of freedom is reduced to three (i.e., x, y and yaw). In this example, the planar surface of the table introduces motion constraints that remove three degrees of freedom from the system. In another example, if a rotational (revolute) joint is attached between a 6-DoF object and another fixed-location object, the rotational joint constrains the motion of the object to one degree of freedom (i.e., rotation about the axis of the revolute joint), by removing five degrees of freedom from the system. These examples are physical motion constraints, but motion constraints can also be applied in software to remove one or more degrees of freedom from controlled motion.

For the system involving a cable-suspended platform and its operator, which in standard operation can control six degrees of freedom in free space, the distance measurement information is used to constrain the motion of the cable-suspended platform so that one or more of the degrees of freedom of the cable-suspended platform is not directly available to the operator to control. For example, if a motion constraint is applied to the distance to the target object (using real-time measurement data from the laser range meter), the system will attempt to keep the cable-suspended platform at that specified distance. This does not mean that the low-level controller cannot still control six degrees of freedom. Instead, it means that from the operator's point of view, there is one (or more) axis that they are not controlling directly. If a wind gust attempts to push the cable-suspended platform in the direction of the motion constraint, the low-level controller will provide the motion control to compensate for this without requiring user input. This is useful in conditions where it is desirable to maintain a specific offset from a target object. It is also useful in providing virtual boundaries or for collision avoidance.

Once the measurement data has been acquired, it can be displayed to the user or used for additional capabilities, such as providing motion constraints that can be used for vehicle control. This extension enables motion control capabilities for the cable-suspended platform 16 based on feedback of the data from the sensors and derived measurement data. This results in the ability to provide for semi-automated control to the system, as well as more intuitive manual control.

For the embodiments that employ laser pointers, the only types of motion constraints that can be added to the control system are those associated with position, since these embodiments do not measure orientation. The embodiments that have two or more laser range meters have the ability to measure orientation of the cable-suspended platform 16 relative to the target object 102, in addition to determining the distance. This allows the embodiments with more than one laser range meter to control both position and orientation of the cable-suspended platform 16 relative to the target object 102.

Figure 18:
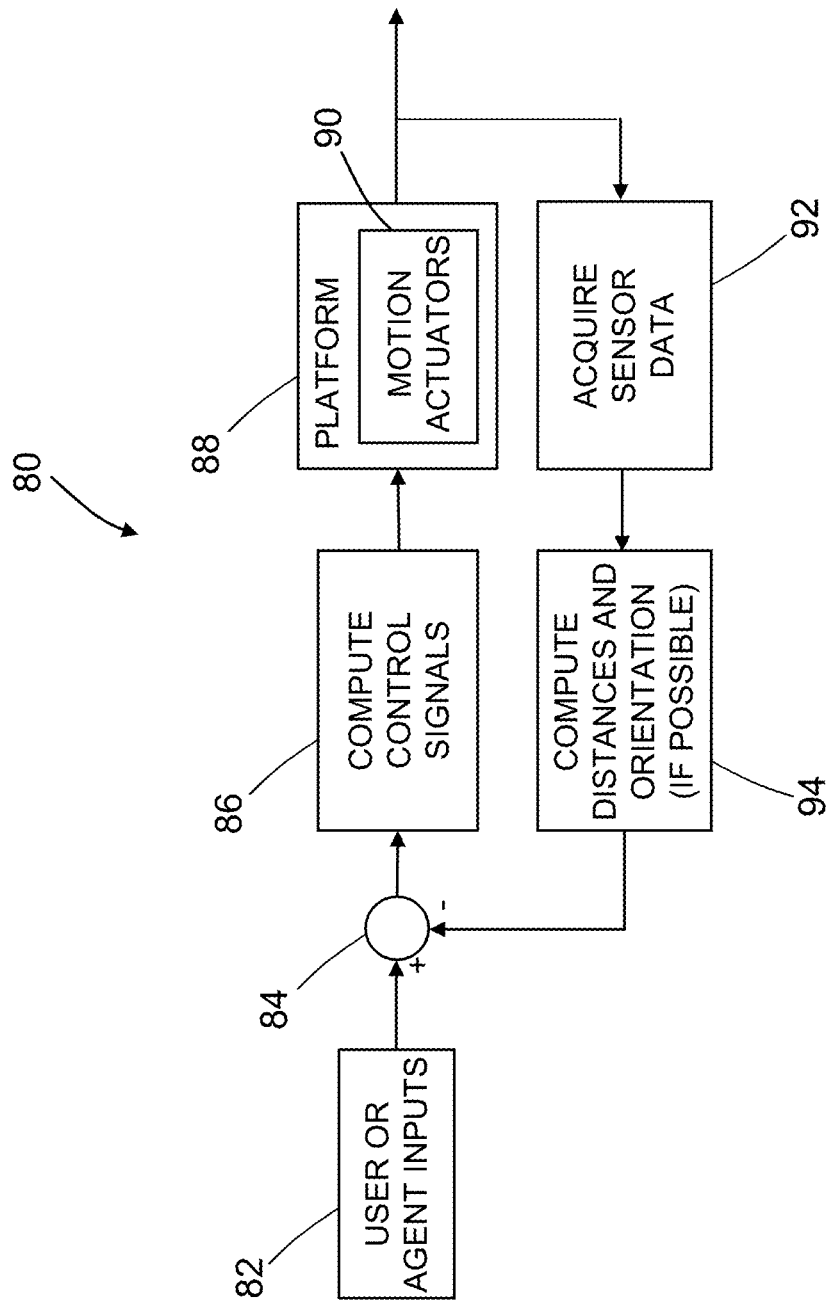
FIG. 18 is a block diagram identifying steps of a feedback control process for controlling the motion of a cable-suspended platform based on measurement data acquired by on-board equipment.

FIG. 18 is a block diagram identifying steps of a feedback control process 80 for controlling the motion of a platform 88 based on measurement data acquired by the equipment on-board the platform 88 in accordance with one embodiment. First, the user or agent inputs commands regarding the target distance and orientation of the platform 88 (step 82), which inputs are received by a summing junction 84. The summing junction 84 also receives distance and orientation data from a distance and orientation computation software module which is configured to compute distance and orientation (step 94). The summing junction 84 subtracts the computed distance from the commanded distance and subtracts the computed orientation from the commanded orientation. The resulting deviations are output to a control signal computation software module that is configured to compute control signals calculated to reduce the deviations (step 86). Based on the output from the summing junction 84, the control signal computation software module outputs control signals to the motion actuators 90 (e.g., motor controllers 114). During movement of the platform 88, the sensors acquire sensor data (step 92), which sensor data is used to compute the distance and orientation (step 94).

In accordance with some embodiments, the computer system 162 uses an on-board alignment methodology to determine relative location (position and orientation) offsets of the video camera 130 relative to the target object 102. This process uses distance information from three laser range meters 138 to compute relative location in real-time. The computer system 162 then uses that data to produce the desired feedback-based motion of the pan-tilt mechanism 120.

One form of control that this process enables is semi-automated control to assist an operator in some aspect of alignment, such as orientation of the video camera 130 to make sure that its focal axis is always perpendicular to the surface of the target object 102 or making sure that it is always a specific distance from the surface.

More specifically, the computer system 162 is configured (e.g., programmed) to determine what movements are needed to align the focal axis of the video camera 130 with a vector normal to the surface of the target object 102 based on the distance information received from the laser range meters 138. The computer system 162 sends command signals to selected motor controllers 168 to activate the pan and tilt motors 122 and 124 as needed to orient the video camera 130 so that its focal axis is aligned with the surface normal.

In addition to using the three laser range meters 138 to determine distance to the target object 102, they are also used to determine the yaw and pitch orientation angles (hereinafter "yaw angle" and "pitch angle"). For the purpose of illustration, assume that the three laser range meters 138 are disposed at the vertices of an isosceles triangle such that the distance separating the two laser range meters disposed at the vertices of the base of the isosceles triangle is a and the distance separating the third laser range meter and a midpoint of the base of the isosceles triangle (i.e., the height of the isosceles triangle) is b. Assume that $d_1$, $d_2$, and $d_3$ are the respective measured distances of the respective laser range meters to the surface of the target object. Equations (2) and (3) can be used to calculate the pitch and yaw angles:

$$\text{PitchAngle} = a\tan 2(d_1 - (d_2 + d_3)/2, b) \qquad (2)$$

$$\text{YawAngle} = a\tan 2(d_2 - d_3, a) \qquad (3)$$

where PitchAngle and YawAngle are the current computed orientation angles relative to the surface of the target object 102, and a tan 2 is the two argument arctangent inverse trigonometric function. The goal for these angles, which are measured relative to the surface normal at the current location, is to be equal to zero; and the process to achieve the goal angles is described below.

With the current yaw and pitch angles calculated, the system motion controller can use a velocity control method for the controlled motions: pan, tilt, and distance. A feedback controller, such as a proportional-integral-derivative (PID) controller, can be used to drive to zero the error between the current angle and the desired angle. Equations (4) and (5) can be used to compute the pitch and yaw motion control:

$$\text{PitchRate} = Kp_{pitch}*(\text{PitchAngle} - \text{PitchAngle}_{goal}) \qquad (4)$$

$$\text{YawRate} = Kp_{yaw}*(\text{YawAngle} - \text{YawAngle}_{goal}) \qquad (5)$$

where PitchRate and YawRate describe the angular rotation rates about the pitch axis of the alignment apparatus and yaw axis of the base, respectively; $Kp_{pitch}$ and $Kp_{yaw}$ are the proportional feedback gains associated with the pitch and yaw axes, respectively; PitchAngle and YawAngle are the angles computed from Eqs. (2) and (3), respectively; and PitchAngle$_{goal}$ and YawAngle$_{goal}$ are the desired goal angles to which the controller is driving the system toward (as mentioned earlier, these are both zero for this example). Integral and derivative feedback may also be used, but are not shown here.

The various embodiments partly depicted in FIGS. 3, 6, 8, 12 and 15 may be used in conjunction with cable suspension systems different that the example cable suspension system depicted in FIG. 1. For example, FIG. 19 shows a system for inspecting and measuring a target object 102 using a camera-equipped cable-suspended platform 18 in accordance with alternative embodiments.

Figure 19:
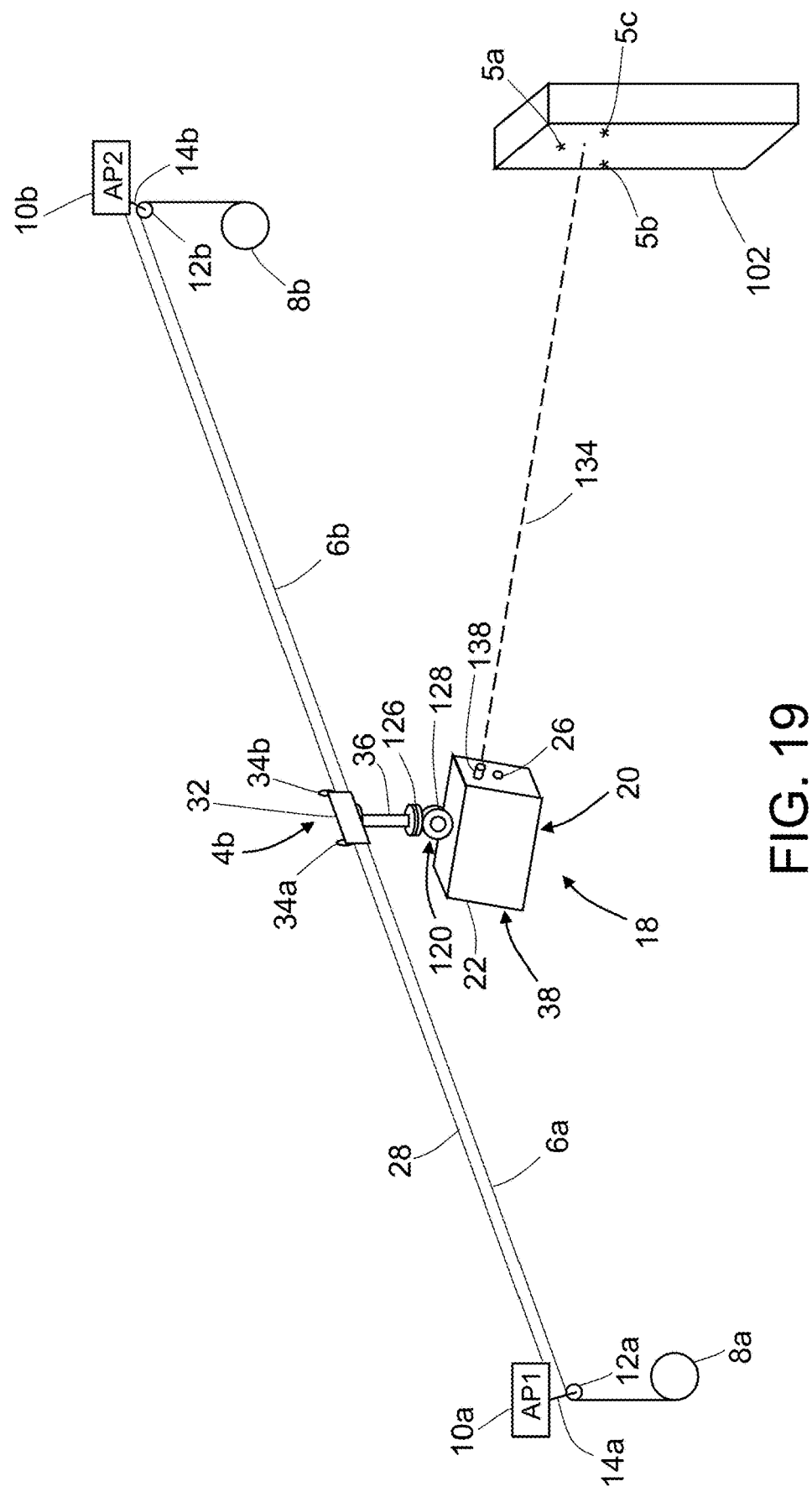
FIG. 19 is a diagram showing a system for inspecting and measuring a target object using a camera-equipped cable-suspended platform in accordance with alternative embodiments.

In accordance with the measurement system depicted in FIG. 19, the cable-suspended platform 18 is suspended from a fixed-length cable 28 that has ends attached to respective anchor points 10a and 10b. In this case the cable-suspended platform 18 comprises a rigid support structure 4b. In accordance with one embodiment, the rigid support structure 4b comprises an equipment support member 36 that is fixedly connected to and depends from a trolley 32. The trolley 32 comprises a pair of rollers 34a and 34b that roll on and along the fixed-length cable 28. The ends of the cables 6a and 6b are attached to the trolley 32. The cables 6a and 6b are paid out or pulled in by respective motor-driven spools 8a and 8d, with the paid-out portion of the cable being passed over respective pulleys 12a and 12b. The pulleys 12a and 12b are in turn rotatably coupled to respective yokes 14a and 14b which are rigidly connected to respective anchor points 10a and 10b. The anchor points 10a and 10b may be attached to walls or ceilings for indoor applications or mounted on poles or cranes for outdoor applications. As long as the locations of the spools 8a and 8b and the lengths of the paid-out portions of cables 6a and 6b are known, the computer system (not shown in FIG. 19) that controls movement of the trolley 32 can be configured to track the location of the center of the trolley 32 in the frame of reference of the anchor points.

In accordance with the system depicted in FIG. 19, the cable-suspended platform 18 further comprises a local positioning system 38 attached to a bottom end of the equipment support member 36. The local positioning system 38 comprises a pan-tilt mechanism 120 mounted to the bottom end of the equipment support member 36, a camera 20 mounted to the pan-tilt mechanism 120, and a laser range meter 138, as previously described. A wireless transceiver and an on-board antenna (not shown in FIG. 19) enable bidirectional, wireless electromagnetic wave communications with a control station similar to control station 150 as previously described. In the alternative, the communications could be via wires. Rotation of the spools of spools 8a and 8b may be controlled in the manner previously depicted in and described with reference to FIG. 2B. For example, the exact position of the center of the trolley 32 can be tracked by configuring the winch unit control computer 112 to calculate the respective lengths of the paid-out portions of cables 6a and 6b by counting the pulses output by the respective rotational encoders associated with each spool 8a and 8b.

In accordance with one alternative embodiment, a measurement system similar to the system depicted in FIG. 1 can be provided that uses three cables instead of four cables for supporting the platform. In accordance with another alternative embodiment, a measurement system similar to the system depicted in FIG. 19 can be provided in which the fixed-length cable 28 is eliminated, so that the platform is supported by cables 6a and 6b only.

While methods for controlling the operation of a cable-suspended platform during non-destructive inspection of a structure have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The above examples are exemplary only, and thus are not intended to limit in any way the definition and/or meaning of the term "computer system".

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

As used in the claims, the term "location" comprises position in a three-dimensional coordinate system and orientation relative to that coordinate system.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatively unless the claim language explicitly states a condition that precludes such an interpretation.

APPENDIX

Figure 20:
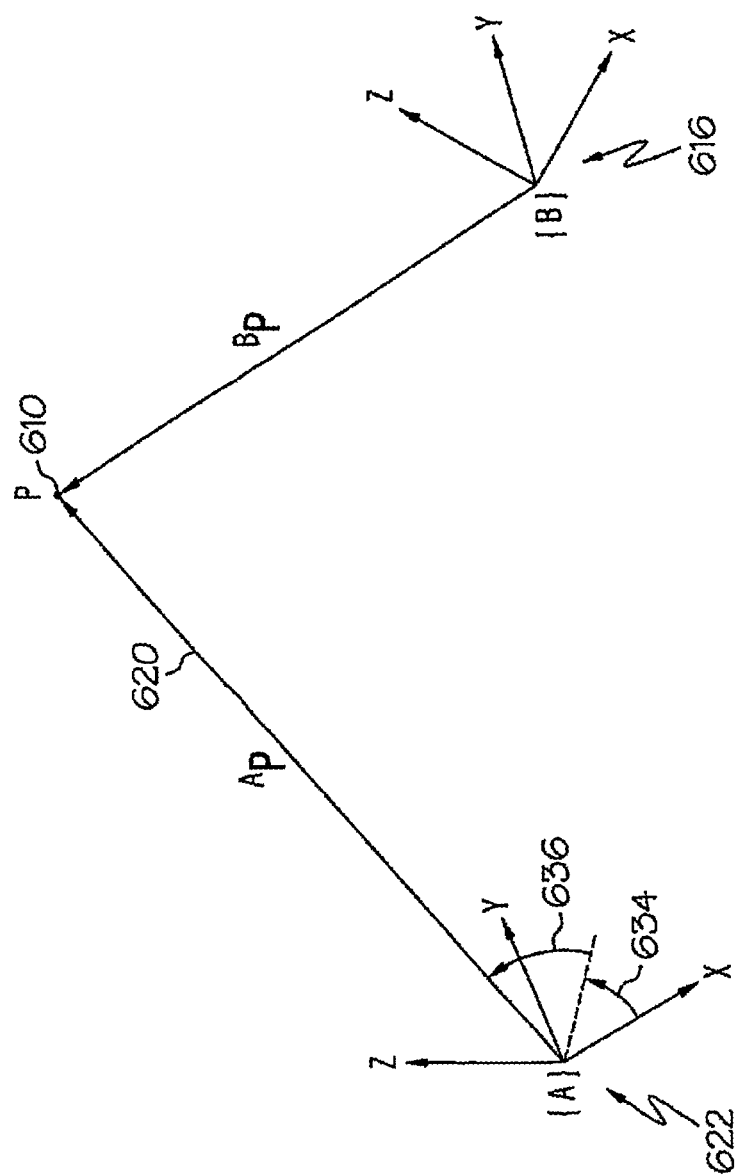
FIG. 20 is a diagram referred to in the Appendix and showing a position vector $^{A}P$ extending from the origin of an instrument coordinate system {A}, substantially along the aim point axis of the instrument, to a point of interest P and showing a position vector $^{B}P$ extending from the origin of a target object coordinate system {B} to the point of interest P.

FIG. 20 shows a position vector $^AP$ extending from the origin of an instrument coordinate system $\{A\}$, substantially along the aim point axis of the instrument, to a point of interest P and showing a position vector $^BP$ extending from the origin of a target object coordinate system $\{B\}$ to the point of interest P.

Referring to FIG. 20, when the coordinates of a point P in the instrument coordinate system 622 are spherical coordinates of pan (i.e., the pan angle 634 in FIG. 13 of a vector $^AP$ to the point P), tilt (the tilt angle 636 in FIG. 20 of the vector $^AP$ to the point P), and range (the distance along the vector $^AP$ to the point P in FIG. 20), the position of the point P represented as spherical coordinates in the instrument coordinate system 622 is related to the position of the point P in X,Y,Z Cartesian coordinates in the instrument coordinate system 622 from the following equations for the forward kinematics of the instrument 618:

$$X = Range * \cos(pan) * \cos(tilt)$$

$$Y = Range * \sin(pan) * \cos(tilt)$$

$$Z = Range * \sin(tilt)$$

where pan (azimuth) is rotation about the Z axis and tilt (elevation) is rotation about the Y axis in the instrument coordinate system 622.

It is noted that the position of the point P represented as Cartesian coordinates (X,Y,Z) in the instrument coordinate system 622 is related to the position of the point P represented as spherical coordinates (pan, tilt, range) in the instrument coordinate system 622 from the following equations for the inverse kinematics of the instrument 618:

$$pan = \tan(Y, X)^{-1}$$

$$tilt = \tan(Z, \sqrt{X^2 + Y^2})^{-1}$$

$$Range = \tan\sqrt{X^2 + Y^2 + Z^2}$$

In one implementation, a position $^BP$ (which is represented as a column vector in the form $[X,Y,Z,1]^T$) in the target object coordinate system 616 is calculated from a position $^AP$ (also a column vector in the form $[X,Y,Z,1]^T$) in the instrument coordinate system 622 from the equation:

$$^BP = {_A^B}T \, ^AP$$

where T is the calibration matrix. In one example, the calibration matrix is a 4×4 homogeneous transformation matrix having the form:

$$_A^B T = \begin{bmatrix} r_{11} & r_{12} & r_{13} & X \\ r_{21} & r_{22} & r_{23} & Y \\ r_{31} & r_{32} & r_{33} & Z \\ 0 & 0 & 0 & 1 \end{bmatrix}$$

It is noted that a position $^AP$ in the instrument coordinate system 622 can be calculated from a position $^BP$ in the target object coordinate system 616 using the inverse of the calibration matrix from the equation:

$$^AP = ({_A^B}T)^{-1} \, ^BP = {_B^A}T \, ^BP$$

Figure 22:
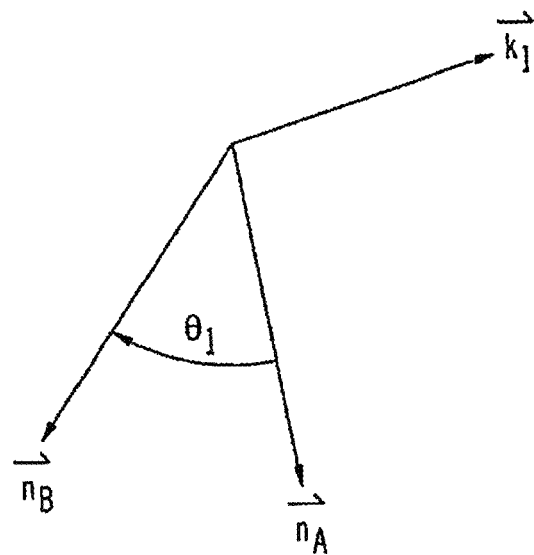
Figure 23:
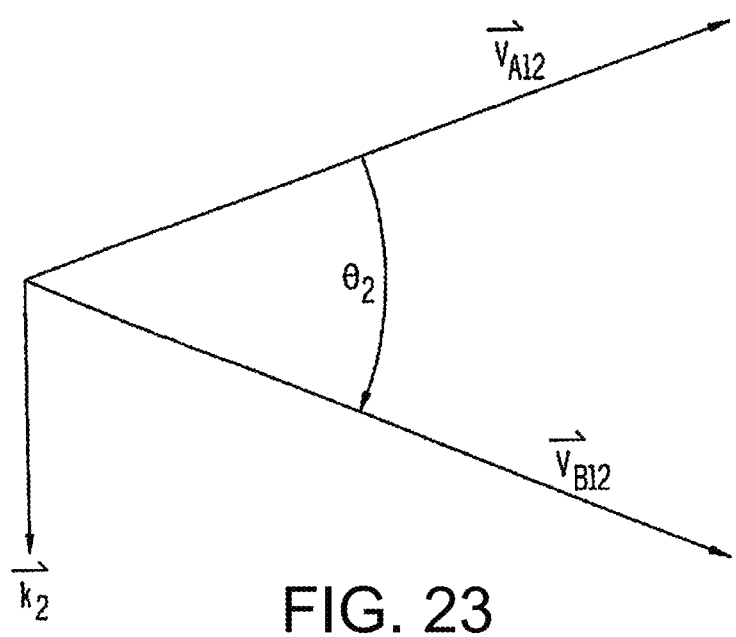

In one example, the three calibration points are non-collinear, and the calibration matrix is calculated as follows:

$$\vec{n}_A = \vec{V}_{A12} \times \vec{V}_{A13}$$

$$\vec{n}_B = \vec{V}_{B12} \times \vec{V}_{B13}$$

$$\vec{k}_1 = \vec{n}_A \times \vec{n}_B$$

$$\theta_1 = a\cos(|\vec{n}_A| \cdot |\vec{n}_B|)$$

$$R_1 = f_1(|\vec{k}_1|, \theta_1)$$

$$\vec{k}_2 = \vec{V}_{A12} \times \vec{V}_{B12}$$

$$\theta_2 = a\cos(|\vec{V}_{A12}| \cdot |\vec{V}_{B12}|)$$

$$R_2 = f_1(|\vec{k}_2|, \theta_2)$$

$$R_{12} = R_1 R_2$$

$$_A^B T = [R_{12}, [R_1(\vec{V}_{B12} - \vec{V}_{A12})]^T]$$

$$_B^A T = (_A^B T)^{-1}$$

wherein, referring to FIGS. 21-23:

$\vec{V}_{A12}$ is the vector in coordinate system A that extends from point $P_{A1}$ to $P_{A2}$;

$\vec{V}_{A13}$ is the vector in coordinate system A that extends from point $P_{A1}$ to $P_{A3}$;

$\vec{V}_{B12}$ is the vector in coordinate system A that extends from point $P_{B1}$ to $P_{B2}$;

$\vec{V}_{B13}$ is the vector in coordinate system A that extends from point $P_{B1}$ to $P_{B3}$;

$\vec{n}_A$ and $\vec{n}_B$ are the normals created from the vector cross products;

$\vec{k}_1$ and $\vec{k}_2$ are axes of rotation;

$\theta_1$ and $\theta_2$ are rotation angles about axes $\vec{k}_1$ and $\vec{k}_2$, respectively;

$R_1$, $R_2$, and $R_{12}$ are 3×3 symmetric rotation matrices; and $f_1()$ is the function (known to those skilled in the art and described, for example, in "Introduction to Robotics: Mechanics and Control", 3rd edition, by John J. Craig and published July 2004 by Prentice Hall Professional Technical Reference) which generates a 3×3 rotation matrix from the angle-axis definition described below:

$$f_1(\hat{k}, \theta) = \begin{bmatrix} k_x k_x v\theta + c\theta & k_x k_y v\theta - k_z s\theta & k_x k_z v\theta + k_y s\theta \\ k_x k_y v\theta + k_z s\theta & k_y k_y v\theta + c\theta & k_y k_z v\theta - k_x s\theta \\ k_x k_z v\theta - k_y s\theta & k_y k_z v\theta + k_x s\theta & k_z k_z v\theta + c\theta \end{bmatrix}$$

where $c\theta = \cos(\theta)$, $s\theta = \sin(\theta)$, $v\theta = 1 - \cos(\theta)$, and $\hat{k} = [k_x, k_y, k_z]$.

Note that the 4×4 homogeneous calibration matrix $_A^B T$ only is computed once for any position of the pointing instrument relative to the target object, and $_A^B T$ can then be used to convert any number of vectors from coordinate system A (the instrument coordinate system 622) into coordinate system B (the target object coordinate system 616). It is also noted that the inverse calibration matrix $_B^A T$ can be calculated by calculating the inverse of the calibration matrix $_A^B T$ or can be calculated directly by switching the order of the vectors in the first equations of the previous paragraph.

The invention claimed is:

1. A method for calculating a position of a point of interest on a target object in a frame of reference using a cable-suspended platform comprising an equipment support member, a pan-tilt mechanism mounted to the equipment support member, a camera mounted to the pan-tilt mechanism, and a laser range meter affixed to the camera, the method comprising:
   (a) suspending the cable-suspended platform from a plurality of cables connected to the equipment support member and supported at respective anchor points of a plurality of anchor points;
   (b) calibrating the pan-tilt mechanism relative to the frame of reference;
   (c) controlling lengths of paid-out portions of the plurality of cables in a manner that causes the equipment support member to move so that the camera is within range of a target object;
   (d) measuring respective distances of a center point of the equipment support member from respective anchor points based in part on the lengths of the paid-out portions of the plurality of cables;
   (e) controlling the pan-tilt mechanism to cause the laser range meter to aim at a point of interest on the target object;
   (f) measuring the pan and tilt angles of the pan-tilt mechanism while the laser range meter is aimed at the point of interest;
   (g) measuring a distance separating the laser range meter and the point of interest; and
   (h) converting the distance and angle measurements into a Cartesian coordinate vector representing the position of the point of interest in the frame of reference.

2. The method as recited in claim 1, wherein the frame of reference is a frame of reference of the target object, and step (b) comprises:
   aiming the laser range meter at three or more calibration points on the target object at different times while the equipment support member is stationary; and
   computing a calibration matrix representing a transformation from a frame of reference of the pan-tilt mechanism to the frame of reference of the target object.

3. The method as recited in claim 2, wherein step (b) further comprises:
   measuring the pan and tilt angles of the pan-tilt mechanism while the laser range meter is aimed at each calibration point; and
   measuring the distance separating the laser range meter and each calibration point while the laser range meter is aimed at each calibration point.

4. The method as recited in claim 1, wherein the frame of reference is a frame of reference of a plurality of at least three anchor points supporting respective cables of the plurality of cables, and step (b) comprises:
   aiming the laser range meter at three or more anchor points of the plurality of anchor points at different times while the equipment support member is stationary; and
   computing a calibration matrix representing a transformation from a frame of reference of the pan-tilt mechanism to the frame of reference of the plurality of anchor points.

5. The method as recited in claim 4, wherein step (b) further comprises:
   measuring the pan and tilt angles of the pan-tilt mechanism while the laser range meter is aimed at each anchor point; and
   measuring the distance separating the laser range meter and each anchor point while the laser range meter is aimed at each anchor point.

6. A method for inspecting and measuring a structure comprising:
   (a) suspending a cable-suspended platform from cables in a vicinity of the structure;
   (b) controlling the cable-suspended platform to move toward the structure;
   (c) using first and second laser range meters on-board the cable-suspended platform to repeatedly measure first and second distances respectively separating the first and second laser range meters from respective first and second spots on a surface of the structure while the cable-suspended platform is moving;
   (d) calculating a separation distance separating the cable-suspended platform from the structure based at least on the first and second distances;

(e) determining whether the separation distance equals a goal offset;

(f) controlling the cable-suspended platform to stay at a first location separated from the structure by the separation distance in response to a determination in step (e) that the separation distance is equal to the goal offset;

(g) using a camera on-board the cable-suspended platform to capture a first image of the structure while the cable-suspended platform is at the first location; and (h) displaying the first image on a display screen.

7. The method as recited in claim 6, wherein the first and second distances are equal to the goal offset, further comprising:

calculating a scale factor for the first image when displayed on the display screen based at least in part on the separation distance and a field of view of the camera; and displaying a scale indicator overlaid on the first image displayed on the display screen, a value or a length of the scale indicator representing the scale factor.

8. The method as recited in claim 6, further comprising:

transmitting a message containing image data representing the first image from the cable-suspended platform;

receiving the message at a control station; and extracting the image data representing the first image from the message, wherein displaying the first image on the display screen comprises controlling states of pixels of the display screen in accordance with the image data.

9. The method as recited in claim 6, further comprising:

controlling the cable-suspended platform to translate to a second location while maintaining the separation distance;

using the camera to capture a second image of the structure while the cable-suspended platform is at the second location; and displaying the second image on the display screen.

10. The method as recited in claim 9, wherein the first and second images respectively comprise first and second sets of image data representing partially overlapping or contiguous areas on the surface of the structure.

11. The method as recited in claim 6, further comprising:

computing an orientation angle of a focal axis of the camera relative to a line connecting the first and second spots on the surface of the structure based on the first and second distances;

calculating a scale factor for the first image when displayed on the display screen based at least in part on the separation distance and the orientation angle; and displaying a scale indicator overlaid on the first image, a value or a length of the scale indicator representing the scale factor.

12. The method as recited in claim 6, further comprising:

using a third laser range meter on-board the cable-suspended platform to repeatedly measure a third distance separating the third laser range meter from a third spot on the surface of the structure while the cable-suspended platform is moving, wherein the separation distance is calculated based on the first, second and third distances;

13. The method as recited in claim 12, further comprising:

computing first and second orientation angles of the focal axis of the camera relative to a plane defined by the first, second and third spots on the surface of the structure based on the first, second and third distances;

calculating a scale factor for the first image when displayed on the display screen based on the separation distance and the first and second orientation angles; and displaying a scale indicator overlaid on the first image, a value or a length of the scale indicator representing the scale factor.

14. The method as recited in claim 6, further comprising:

detecting a deviation of the separation distance from the goal offset after the cable-suspended platform has moved from the first location to a second location; and controlling the cable-suspended platform to move to a third location at which the separation distance equals the goal offset, thereby reducing the deviation to zero.

15. The method as recited in claim 14, further comprising:

computing an orientation angle of a focal axis of the camera relative to the surface of the structure based on the first, second and third distances;

detecting a deviation of the orientation angle from a desired orientation angle while the cable-suspended platform is at the first location; and controlling the orientation of the camera so that the orientation angle equals the desired orientation angle.

16. A method for inspecting and measuring a structure comprising:

(a) suspending a cable-suspended platform from cables in a vicinity of a structure;

(b) controlling the cable-suspended platform to move to and then stay at a location separated from the structure;

(c) directing first and second laser pointers pivotably mounted on-board the cable-suspended platform in parallel toward a surface of the structure, respective pivot axes of the first and second laser pointers being separated by a fixed distance;

(d) using the mutually parallel first and second laser pointers to transmit mutually parallel laser beams onto first and second spots respectively while the cable-suspended platform is at the location;

(e) using a camera on-board the cable-suspended platform at a first time to capture a first image of a portion of the surface of the structure that includes the first and second spots;

(f) pivoting the first and second laser pointers by a predefined angle while the cable-suspended platform is at the location so that the first and second laser pointers are no longer parallel;

(g) using the pivoted first and second laser pointers to transmit non-parallel laser beams onto respective third and fourth spots on the surface of the structure while the cable-suspended platform is at the location;

(h) using the camera at a second time to capture a second image of the portion of the surface of the structure that includes the third and fourth spots; and (i) processing the first and second images to calculate a first separation distance separating the cable-suspended platform from the structure based on positions of the third and fourth spots in the images, the predefined angle and the fixed distance separating the pivot axes of the laser pointers.

17. The method as recited in claim 16, wherein step (i) further comprises calculating a second separation distance separating respective centers of the third and fourth spots, the method further comprising calculating a scale factor for the first and second images when displayed on a display screen based on the second separation distance.

18. The method as recited in claim 17, further comprising:
(j) transmitting a message containing image data representing the first and second images from the cable-suspended platform;
(k) receiving the message at a control station; and
(l) extracting the image data representing the first image from the message,
wherein step (l) is performed at the control station.

19. The method as recited in claim 17, further comprising:
using the camera to capture a third image of a portion of the surface of the structure; and
displaying a scale indicator overlaid on the third image on the display screen, a value or a length of the scale indicator representing the scale factor.

20. A method for sizing a feature of a structure using a cable-suspended platform comprising a pan-tilt mechanism that supports a camera and a laser range meter, the method comprising:
(a) suspending the cable-suspended platform from a plurality of cables supported at respective anchor points of a plurality of anchor points;
(b) controlling lengths of paid-out portions of the plurality of cables in a manner that causes the cable-suspended platform to move to a first location;
(c) measuring respective distances of a center point of the cable-suspended platform from the respective anchor points based in part on the lengths of the paid-out portions of the plurality of cables when the cable-suspended platform is at the first location;
(d) aiming the laser range meter at a first point corresponding to a first visible feature on a surface of the structure while the cable-suspended platform is at the first location and acquiring a first distance measurement;
(e) using the pan-tilt mechanism to measure the respective pan and tilt angles of the laser range meter when the laser range meter is aimed at the first point;
(f) converting the distance and angle measurements acquired in steps (d) and (e) into a first vector representing the location of the first point in a frame of reference of the cable-suspended platform;
(g) controlling lengths of paid-out portions of the plurality of cables in a manner that causes the cable-suspended platform to move from the first location to a second location;
(h) measuring the respective distances of the center point of the cable-suspended platform from the respective anchor points based in part on the lengths of the paid-out portions of the plurality of cables when the cable-suspended platform is at the second location;
(i) aiming the laser range meter at a second point corresponding to a second visible feature on the surface of the structure while the cable-suspended platform is at the second location and acquiring a second distance measurement;
(j) using the pan-tilt mechanism to measure the respective pan and tilt angles of the laser range meter when the laser range meter is aimed at the second point;
(k) converting the distance and angle measurements acquired in steps (i) and (j) into a second vector representing the location of the second point in the frame of reference of the cable-suspended platform;
(l) generating a transformation matrix representing a position difference and an orientation difference between the first and second locations of the cable-suspended platform based on information acquired in steps (c) and (h);
(m) multiplying the second vector by the transformation matrix to form a third vector representing the location of the second point in the frame of reference of the cable-suspended platform at the first location; and
(n) calculating a distance between the first and second points using the first and third vectors.

21. The method as recited in claim 20, further comprising:
(o) transmitting one or more messages containing measurement data from the cable-suspended platform;
(p) receiving the one or more messages at a control station; and
(q) extracting the measurement data from the message,
wherein steps (f) and (k) through (n) are performed by a computer system at the control station.

22. The method as recited in claim 21, further comprising:
using the camera to capture an image of a portion of the surface of the structure that includes the first and second visible features while the cable-suspended platform is at the first location; and
displaying the image and symbology representing a value of the distance calculated in step (n) overlaid on the image on a display screen at the control station.

23. The method as recited in claim 20, wherein the first and second visible features are respective endpoints of an anomaly in the structure.

24. A system for inspecting and measuring a structure comprising:
at least two anchor points;
at least two pulleys, each pulley being supported by a respective anchor point;
at least two spools;
at least two spool motors, each spool motor being operatively coupled for driving a respective spool to rotate;
at least two rotational encoders, each rotational encoder being operatively coupled to detect incremental angular movements of a respective spool;
a platform comprising a rigid support structure, a pan-tilt mechanism mounted to the rigid support structure, a camera mounted to the pan-tilt mechanism, and a laser range meter mounted to the camera;
at least two cables connected to the rigid support structure, each cable having a first portion wrapped around a respective spool and a second portion in contact with a respective pulley;
a computer system configured to control operation of the pan-tilt mechanism and the spool motors and to selectively activate the camera and laser range meter; and
a transceiver configured to enable communication between the computer system and a control station,
wherein the computer system is further configured to:
receive image data from the camera, pan and tilt angle data from the pan-tilt mechanism, distance data from the laser range meter, and rotation data from the rotational encoders;
determine a first location of the platform relative to a structure; and
send commands for controlling the spool motors in a manner that causes the platform to move from the first location to a second location whereat the camera is separated from a surface of the structure by a goal offset.

25. The system as recited in claim 24, wherein the rigid support structure comprises an equipment support member and a cable attachment ring affixed to or integrally formed with the equipment support member, and the number of cables attached to the cable attachment ring is at least three.

26. The system as recited in claim 24, wherein the rigid support structure comprises an equipment support member and a trolley affixed to or integrally formed with the equipment support member, the number of cables attached to the trolley is two, and the number of anchor points is two, further comprising a third cable connecting the two anchor points, and wherein the trolley comprises first and second rollers that roll on the third cable.

* * * * *